(12) United States Patent
Westerink et al.

(10) Patent No.: US 8,911,020 B2
(45) Date of Patent: Dec. 16, 2014

(54) ADJUSTABLE HEAD REST

(75) Inventors: Rik Westerink, Corinth, TX (US); Timothy W. Terleski, Richardson, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 248 days.

(21) Appl. No.: 13/432,072

(22) Filed: Mar. 28, 2012

(65) Prior Publication Data

US 2012/0292973 A1 Nov. 22, 2012

Related U.S. Application Data

(60) Provisional application No. 61/516,106, filed on Mar. 28, 2011, provisional application No. 61/516,085, filed on Mar. 28, 2011, provisional application No. 61/486,932, filed on May 17, 2011.

(51) Int. Cl.
*A47C 7/36* (2006.01)
*B60N 2/48* (2006.01)
*B64D 11/06* (2006.01)

(52) U.S. Cl.
CPC .............. *B64D 11/06* (2013.01); *B60N 2/4808* (2013.01); *B64D 2011/0668* (2013.01); *B60N 2/4882* (2013.01); *B60N 2/4802* (2013.01); *B60N 2/48* (2013.01); *B60N 2/4829* (2013.01); *Y02T 50/46* (2013.01)
USPC .......................................... 297/407; 297/406

(58) Field of Classification Search
USPC .................................. 297/391, 406, 407, 410
See application file for complete search history.

(56) References Cited

U.S. PATENT DOCUMENTS

| 6,220,668 B1 * | 4/2001 | Scheffzuck .................... 297/391 |
| 6,250,716 B1 | 6/2001 | Clough |
| 7,144,083 B2 * | 12/2006 | List et al. ....................... 297/391 |
| 7,201,448 B2 * | 4/2007 | Williamson et al. .......... 297/407 |

(Continued)

FOREIGN PATENT DOCUMENTS

| DE | 102009021267 A1 | 11/2010 |
| FR | 1511580 A | 2/1968 |

(Continued)

OTHER PUBLICATIONS

International Search Report and Written Opinion dated Apr. 18, 2013 in Application No. PCT/US2012/030785.

(Continued)

*Primary Examiner* — Milton Nelson, Jr.
(74) *Attorney, Agent, or Firm* — Kilpatrick Townsend & Stockton LLP; Dean W. Russell, Esq.; Tiffany L. Williams, Esq.

(57) ABSTRACT

Described are passenger seats having a seat back support and a head rest assembly coupled to the seat back support. The head rest assembly includes a head support and a lower head support with a rest bar and a pair of extensions, wherein a first end of each extension is slidingly coupled to the rest bar and a second end of each extension is pivotally coupled to the head support. The rest bar is positioned adjacent the head support when the lower head support is in a stowed position and is positioned a distance forward of the head support when the lower head support is in a deployed position.

11 Claims, 23 Drawing Sheets

(56) References Cited

U.S. PATENT DOCUMENTS

| | | | |
|---|---|---|---|
| 7,264,313 B2* | 9/2007 | Clough | 297/407 |
| 2004/0007910 A1* | 1/2004 | Skelly | 297/406 |
| 2004/0007918 A1 | 1/2004 | Clevenger et al. | |

FOREIGN PATENT DOCUMENTS

| | | | |
|---|---|---|---|
| FR | 2876327 | A1 | 4/2006 |
| FR | 2884774 | A1 | 10/2006 |
| JP | 09075167 | A | 3/1997 |
| JP | 2006305193 | A | 11/2006 |
| WO | 2012134245 | | 10/2012 |

OTHER PUBLICATIONS

International Preliminary Report on Patentability dated Oct. 10, 2013 in Application No. PCT/US2012/030785.

* cited by examiner

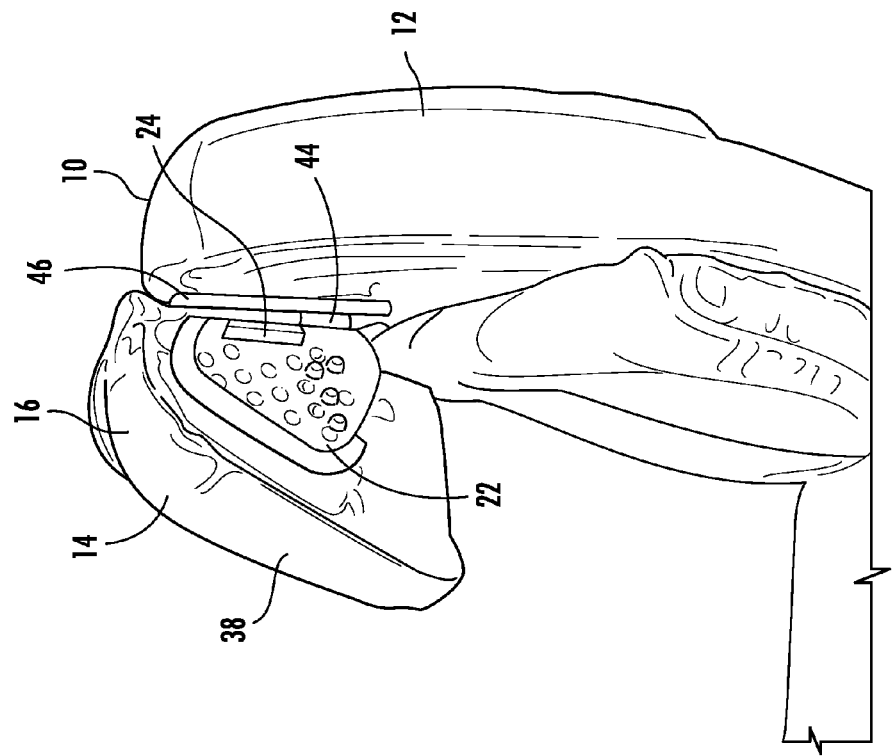
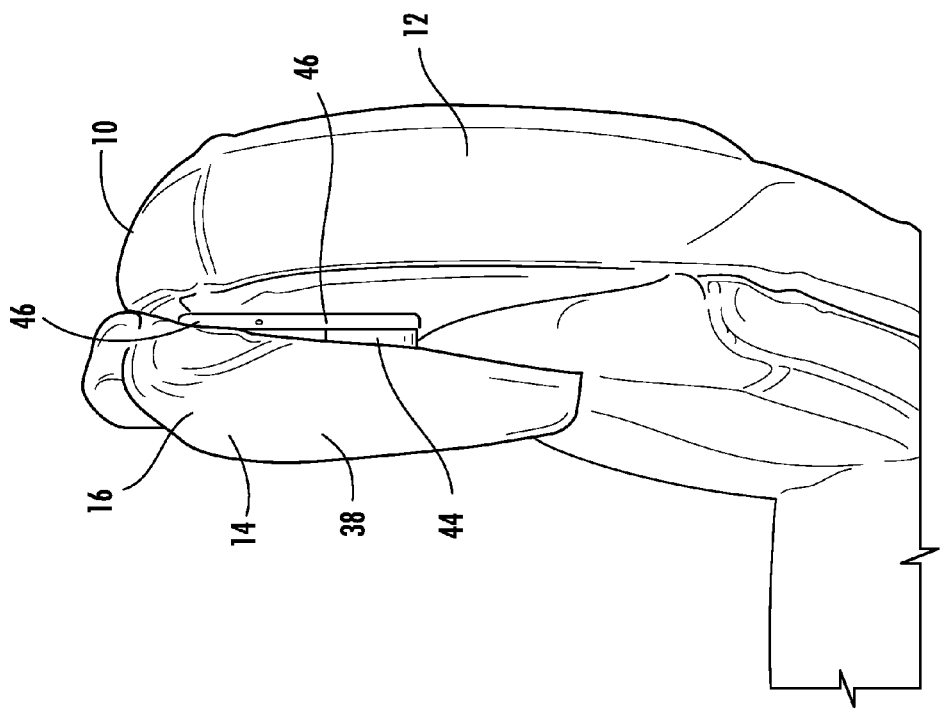

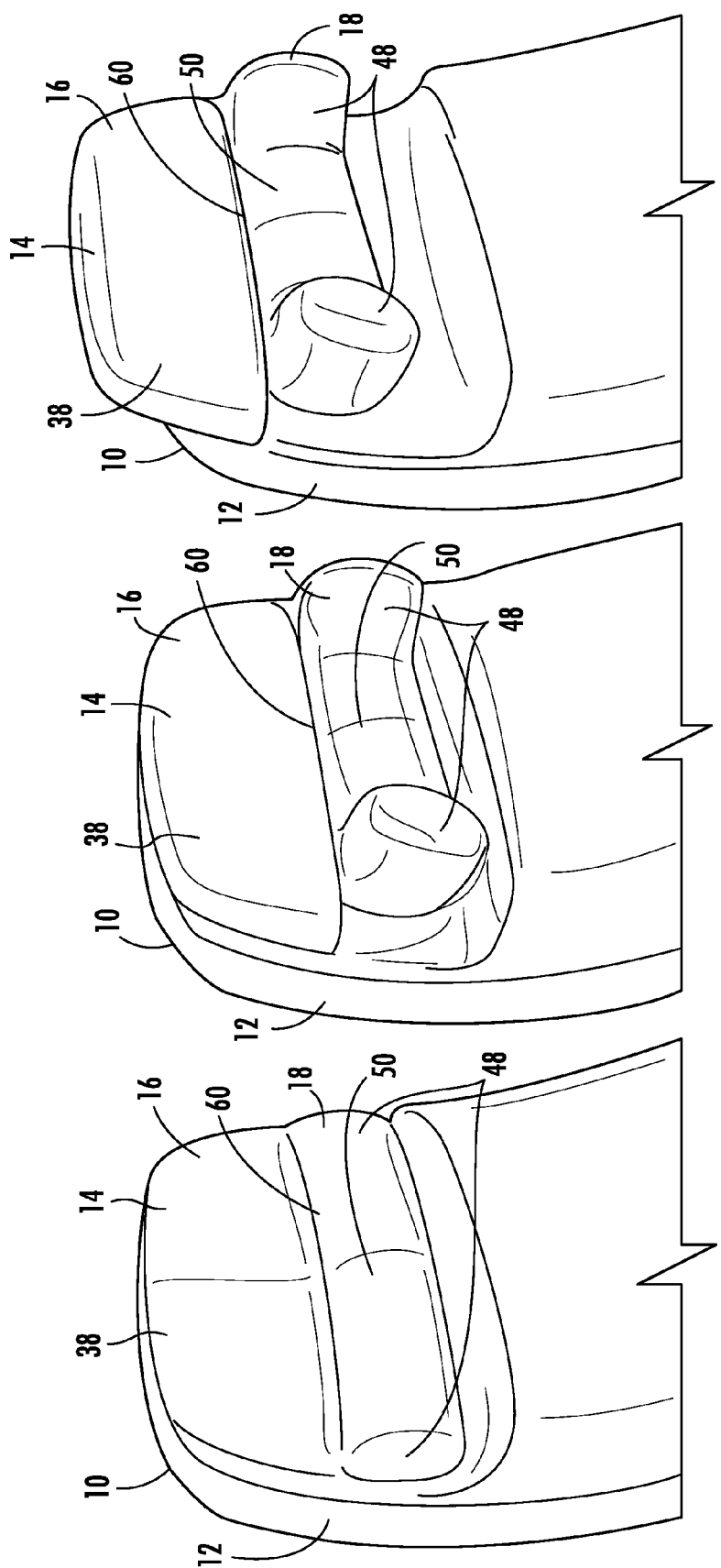

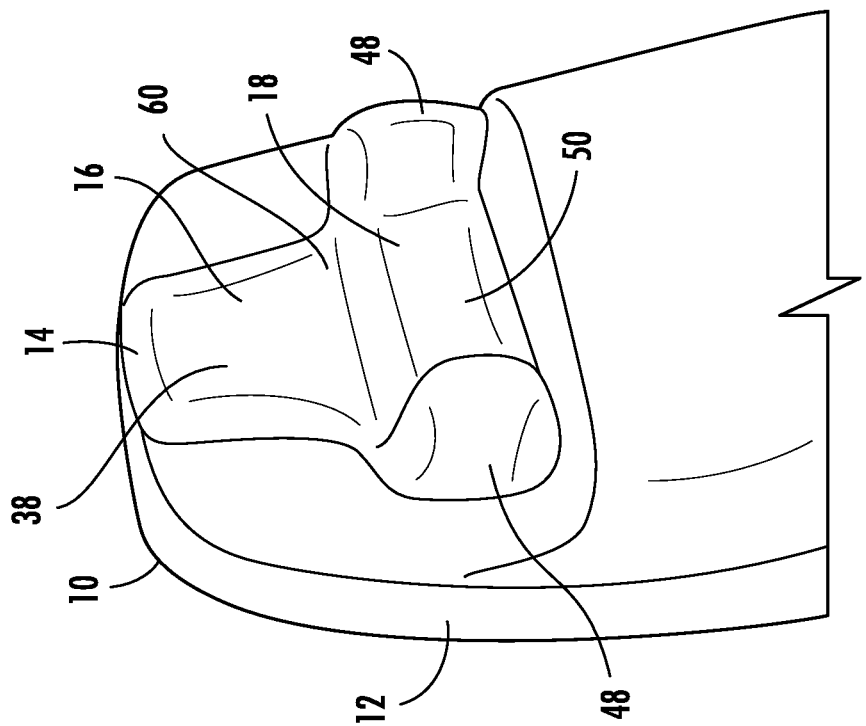
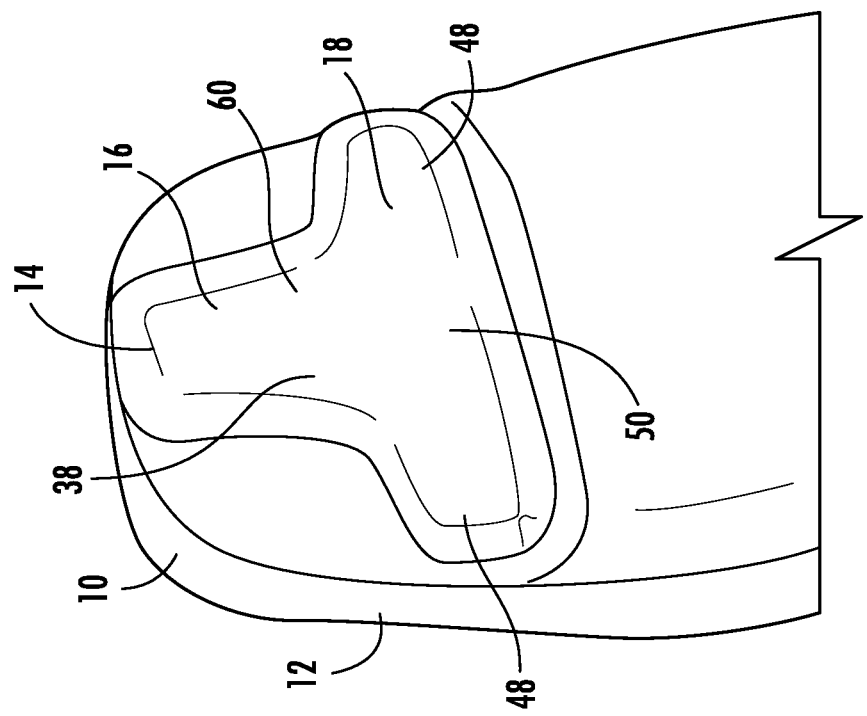

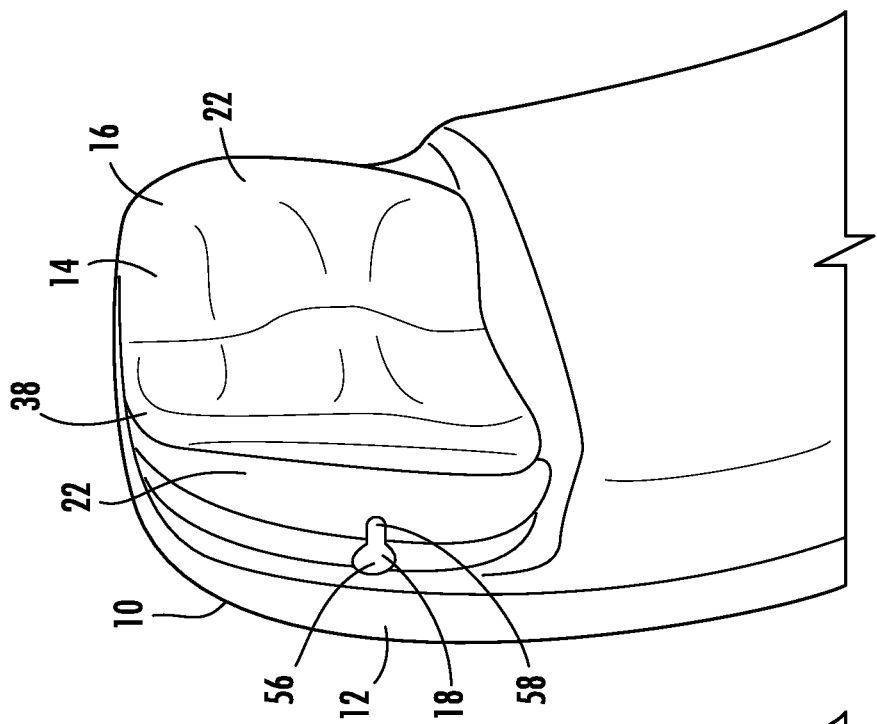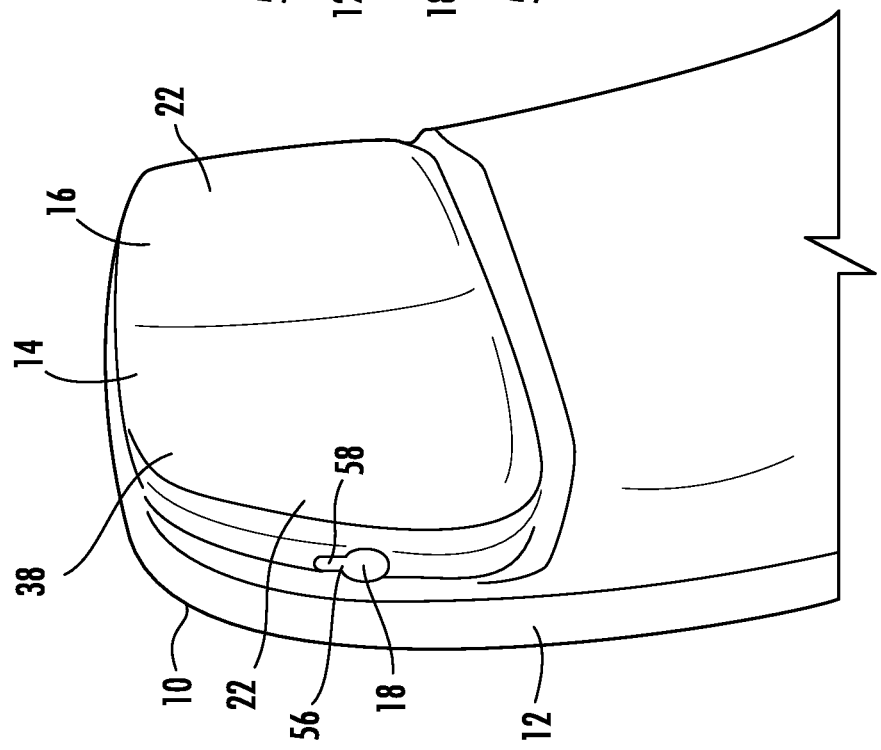

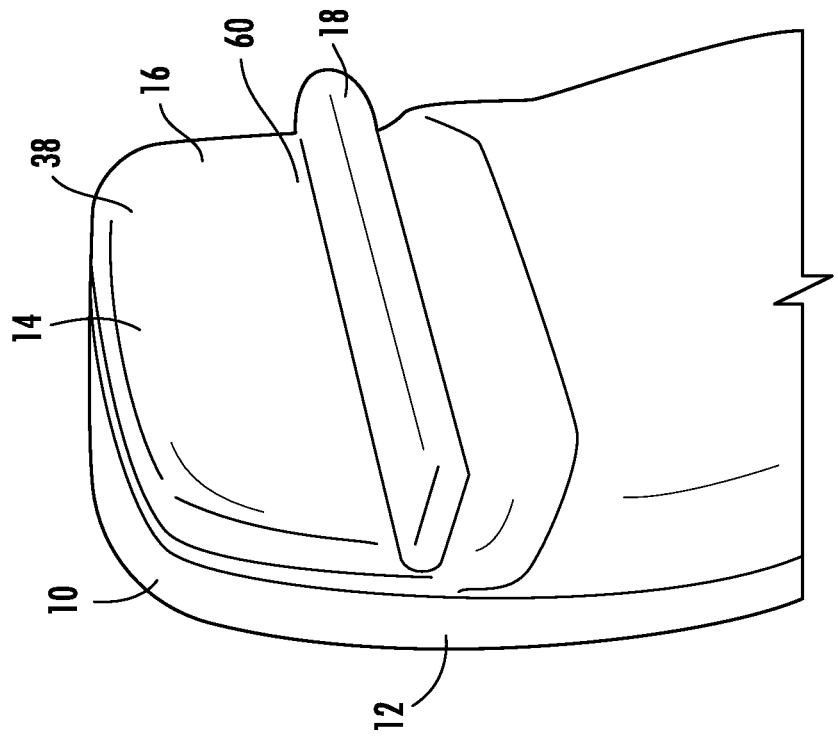
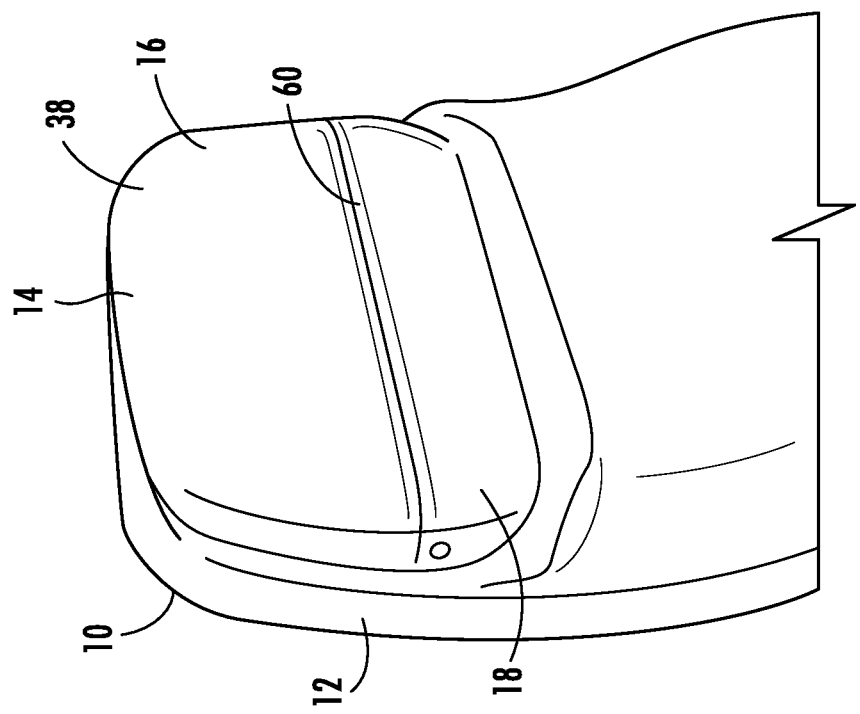

ADJUSTABLE HEAD REST

CROSS REFERENCE TO RELATED APPLICATIONS

This application is related to and claims priority benefits from U.S. Provisional Application Ser. No. 61/516,106, filed on Mar. 28, 2011, entitled "HEADREST DEVELOPMENT," U.S. Provisional Application Ser. No. 61/516,085, filed on Mar. 28, 2011, entitled "HEADREST WITH ADJUSTABLE NECK SUPPORT FEATURE," and U.S. Provisional Application Ser. No. 61/486,932, filed on May 17, 2011, entitled "HEADREST WITH ADJUSTABLE NECK SUPPORT FEATURE." The '106, '085, and '932 applications are hereby incorporated in their entireties by this reference.

FIELD OF THE INVENTION

The field of the invention relates to passenger seats. More specifically, it relates to passenger seats with adjustable head support for the passenger.

BACKGROUND

In various modes of transportation, a passenger may be subjected to a passenger seat for various lengths of time. In airline travel, for example, it is not uncommon for a passenger to be seated in a passenger seat for multiple hours. During such time, it is beneficial to the passenger's overall comfort if the passenger's head is properly supported.

Traditional passenger seats, with fixed orientation positions, cannot be adequately adjusted to provide each passenger with the head support (or comfort level) that he or she requires. As a result, passengers typically bring personal items, such as pillows and blankets, on board to achieve such support. These items may be quite cumbersome, however, and typically intrude into the personal space of another passenger.

In some cases, a lower head support may be integrated into the head rest through shaping of the head rest cushion, but there is typically no adjustment available. For example, as shown in FIGS. 1 and 2, a head rest with an integrated and non-adjustable lower head support intrudes into a longer passenger's shoulders and/or upper back, which causes the passenger to assume an uncomfortable posture. Thus, the traditional design of these lower head supports may create uncomfortable seating for longer passengers, and may prevent the head rest from being capable of stowing flat during taxi, take off, and landing.

Thus, it may be desirable to provide a head rest assembly that includes a lower head support feature that is adjustable to accommodate passengers of differing lengths, as well as providing stowage capabilities for taxi, take-off, and landing.

SUMMARY

Embodiments of the present invention include a passenger seat comprising a seat back support and a head rest assembly coupled to the seat back support. In certain embodiments, the head rest assembly may be slidingly coupled to the seat back support via at least one track.

In some embodiments, the head rest assembly comprises a head support and a lower head support comprising a rest bar and a pair of extensions, wherein a first end of each extension is slidingly coupled to the rest bar and a second end of each extension is pivotally coupled to the head support. The rest bar may be positioned adjacent the head support when the lower head support is in a stowed position and may be positioned a distance forward of the head support when the lower head support is in a deployed position.

In certain embodiments, the head support includes a head rest pan and a pair of side supports pivotally coupled to the head rest pan via a pair of hinges. In some embodiments, the second end of each extension may be pivotally coupled to one of the pair of side supports via a pair of hinges. In other embodiments, the head support may also include a pair of deployment arms pivotally coupled to the head rest pan via a pair of hinges, wherein the second end of each extension may be pivotally coupled to one of the pair of deployment arms via a pair of hinges. In these embodiments, the pair of side supports and the pair of deployment arms may be configured to rotate between a stowed position and a deployed position independently of the other pair.

A track may be coupled to the rest bar, wherein the first end of each extension is positioned adjacent each end of the track when the lower head support is in the stowed position, and wherein the first end of each extension is positioned proximate a midpoint of the track when the lower head support is in the deployed position.

In certain embodiments, the position of the lower head support is adjustable relative to the head support. For example, a central portion of the lower head support may be integrally coupled to the head support, and a pair of bendable sides are coupled to the central portion, wherein the pair of bendable sides are positioned approximately planar with the central portion when the lower head support is in a stowed position, and wherein the pair of bendable sides are positioned forward of the central portion when the lower head support is in a deployed position. In other embodiments, the lower head support is slidingly coupled to the head support via at least one track or a pocket within the head support. The lower head support, which is rotatably coupled to the head support, may include a projection that is configured so as to not extend in a forward direction when the lower head support is in a stowed position, and to be oriented in the forward direction when the lower head support is in a deployed position.

BRIEF DESCRIPTION OF THE DRAWINGS

FIG. 13 is a side perspective view of a passenger seat with the head rest assembly of FIG. 5 in a stowed position.

FIG. 14 is a side perspective view of a passenger seat with the head rest assembly of FIG. 5 in a fully deployed position.

FIG. 25 is a perspective view of a passenger seat with a head rest assembly according to certain other embodiments of the present invention with a lower head support in a stowed position.

FIG. 26 is a perspective view of a passenger seat with the head rest assembly of FIG. 25 with a lower head support in a fully deployed position.

FIG. 27 is a perspective view of a passenger seat with the head rest assembly of FIG. 25 in a raised position with a lower head support in a fully deployed position.

FIG. 28 is a perspective view of a passenger seat with a head rest assembly according to certain other embodiments of the present invention with a lower head support in a stowed position.

FIG. 29 is a perspective view of a passenger seat with the head rest assembly of FIG. 28 with a lower head support in a fully deployed position.

FIG. 38 is a perspective view of a passenger seat with a head rest assembly according to certain other embodiments of the present invention with side supports and a lower head support in stowed positions.

FIG. 39 is a perspective view of a passenger seat with the head rest assembly of FIG. 38 with side supports and a lower head support in fully deployed positions.

FIG. 40 is a perspective view of a passenger seat with a head rest assembly according to certain other embodiments of the present invention with a lower head support in a stowed position.

FIG. 41 is a perspective view of a passenger seat with the head rest assembly of FIG. 40 with a lower head support in a fully deployed position.

DETAILED DESCRIPTION

Figure 2:
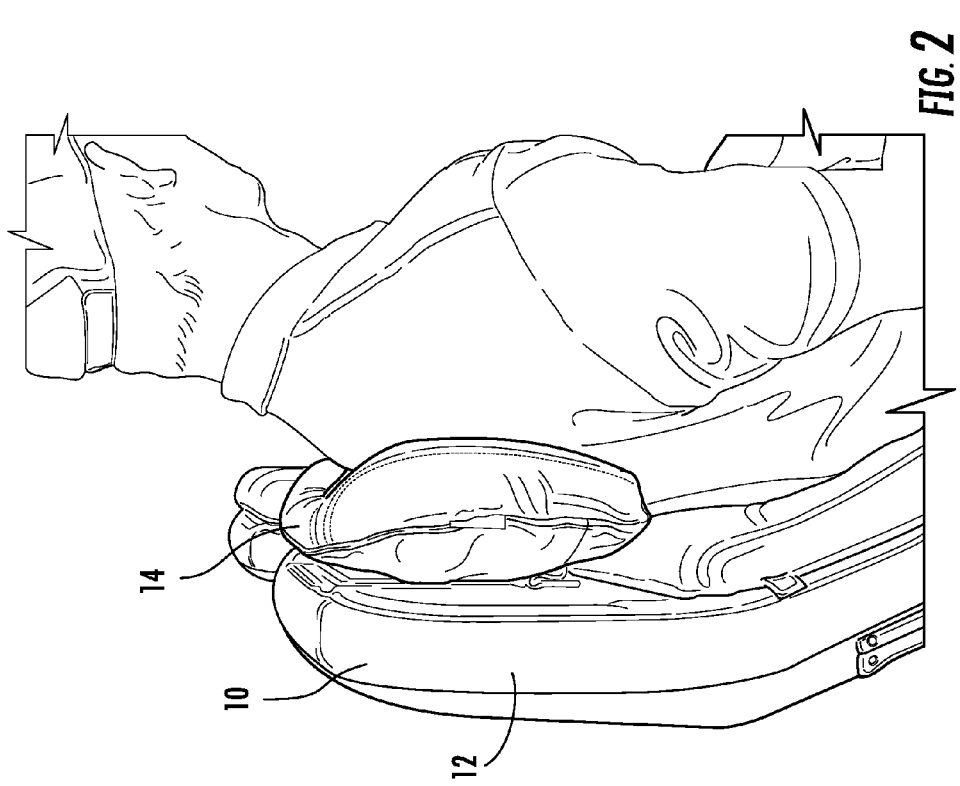
FIG. 2 is a side perspective view of a passenger set with a conventional head rest with side supports bent forward.
Figure 1:
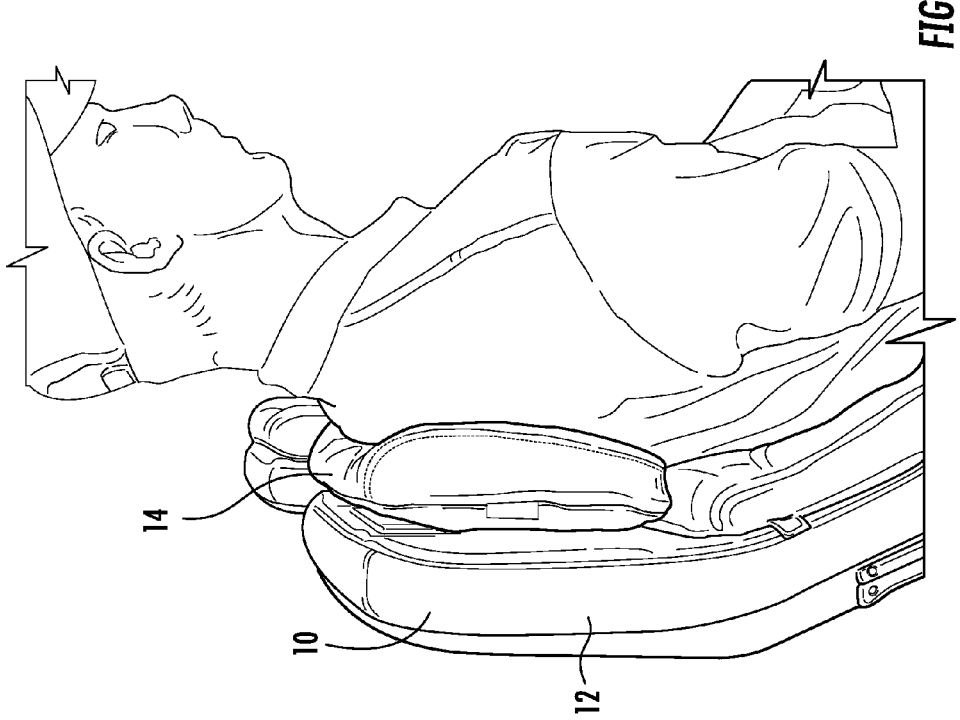
FIG. 1 is a side perspective view of a passenger seat with a conventional head rest.
Figure 3:
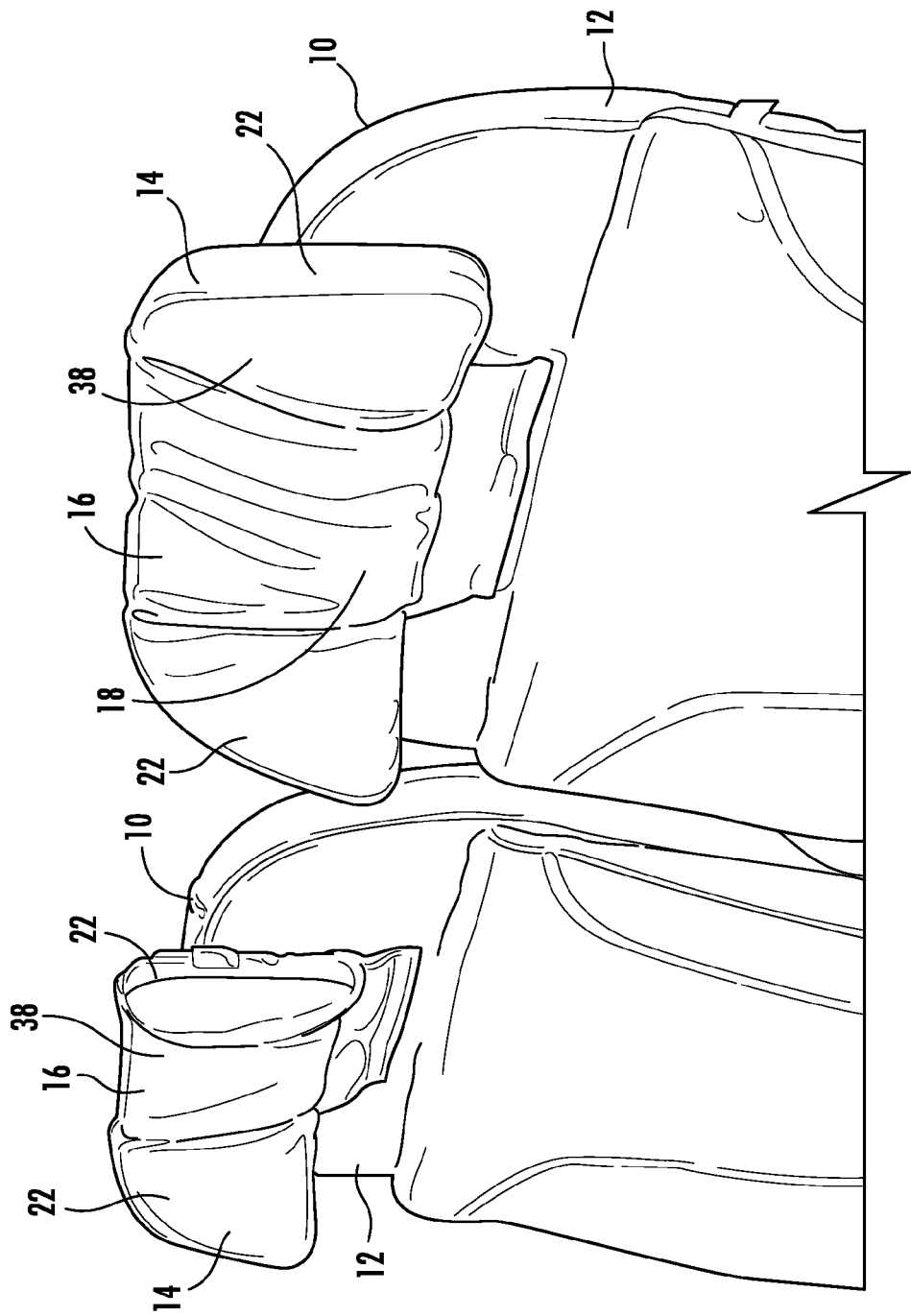
FIG. 3 is a perspective view of a passenger seat with a head rest assembly according to certain embodiments of the present invention on the right and a passenger seat with a conventional head rest on the left.
Figure 4:
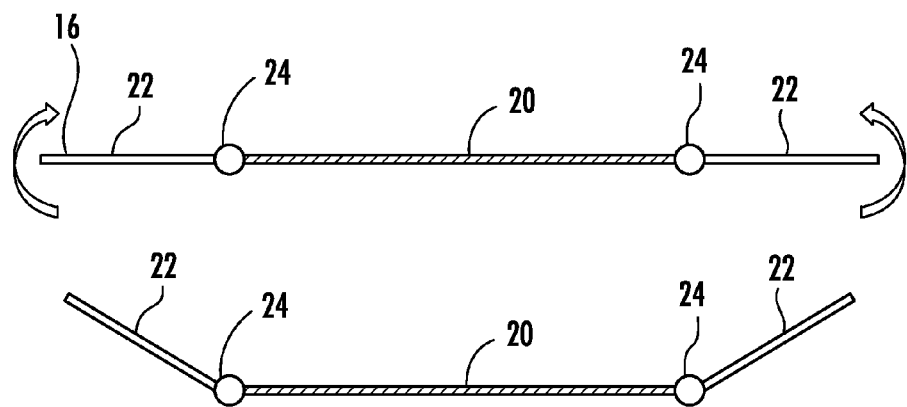
FIG. 4 is a schematic view of a conventional head rest in a stowed and a deployed position.
Figure 5:
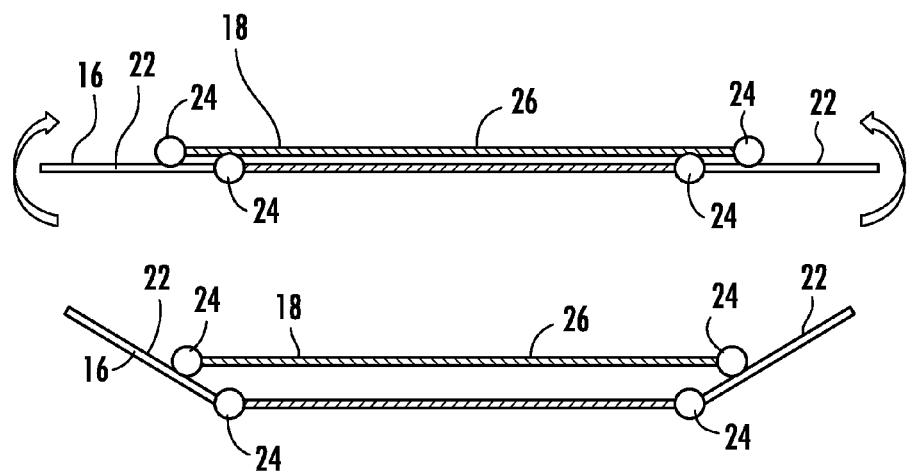
FIG. 5 is a schematic view of a head rest assembly according to certain embodiments of the present invention in a stowed and a deployed position.
Figure 6:
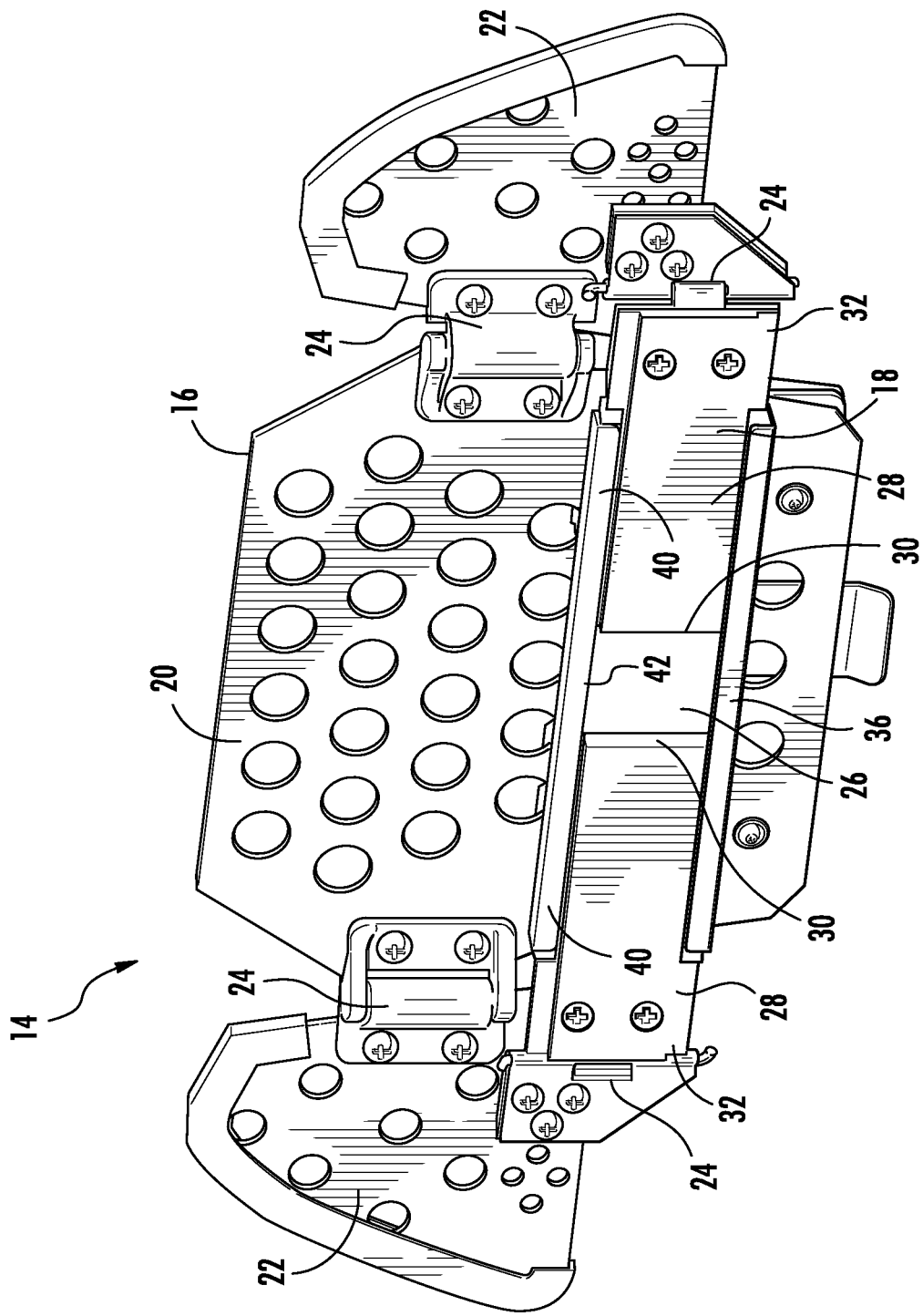
FIG. 6 is a perspective view of the head rest assembly of FIG. 5 in a stowed position.
Figure 7:
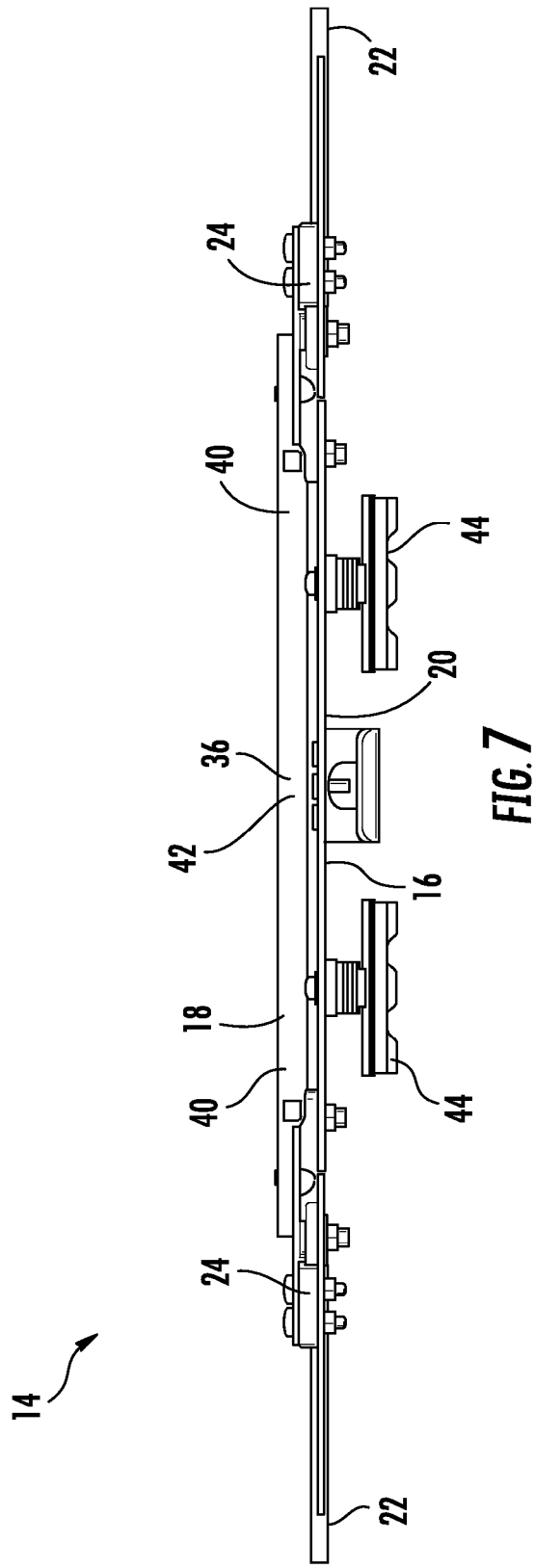
FIG. 7 is a top plan view of the head rest assembly of FIG. 5 in a stowed position.
Figure 8:
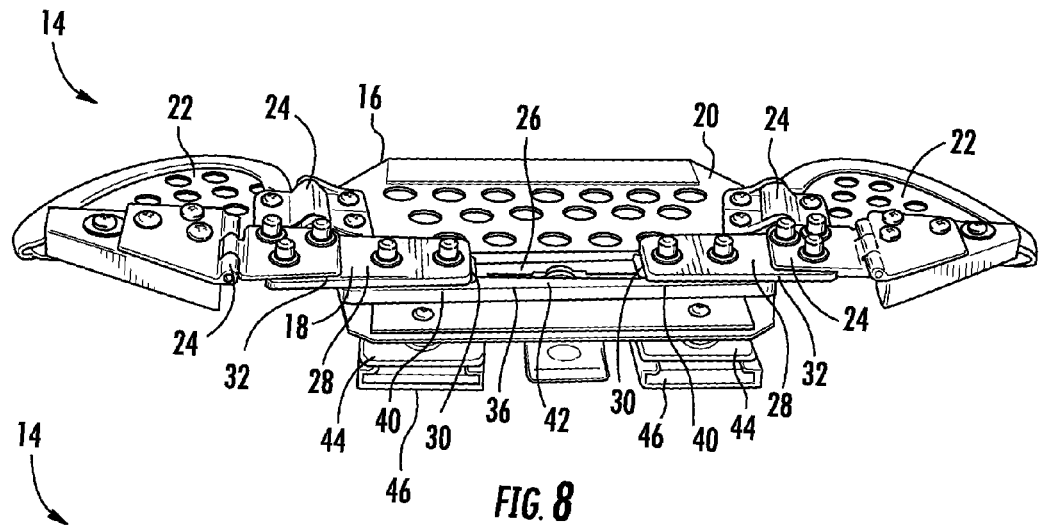
FIG. 8 is a bottom perspective view of the head rest assembly of FIG. 5 in a stowed position.

Embodiments of the invention provide passenger seats with an adjustable support structure for various parts of a passenger's head. While the passenger seats are generally discussed for use with aircrafts, they are by no means so limited. Rather, embodiments of the passenger seats may be used in connection with any mode of transportation or otherwise as desired.

FIGS. 3 and 5-41 illustrate various embodiments of a passenger seat 10. In these embodiments, the passenger seat 10 may comprise a seat back support 12 and a head rest assembly 14, wherein the head rest assembly 14 comprises a head support 16 and a forward and/or aft adjustable lower head support 18. This forward/aft adjustment allows passengers to adjust the lower head support 18 to accommodate a comfortable resting position for each passenger's unique neutral head posture. While the lower head support 18 are generally discussed as providing support for a lower portion of a passenger's head, they are by no means so limited. Rather, embodiments of the lower head support 18 may be used to support a passenger's neck or other regions of the head or otherwise as desired.

Figure 15:
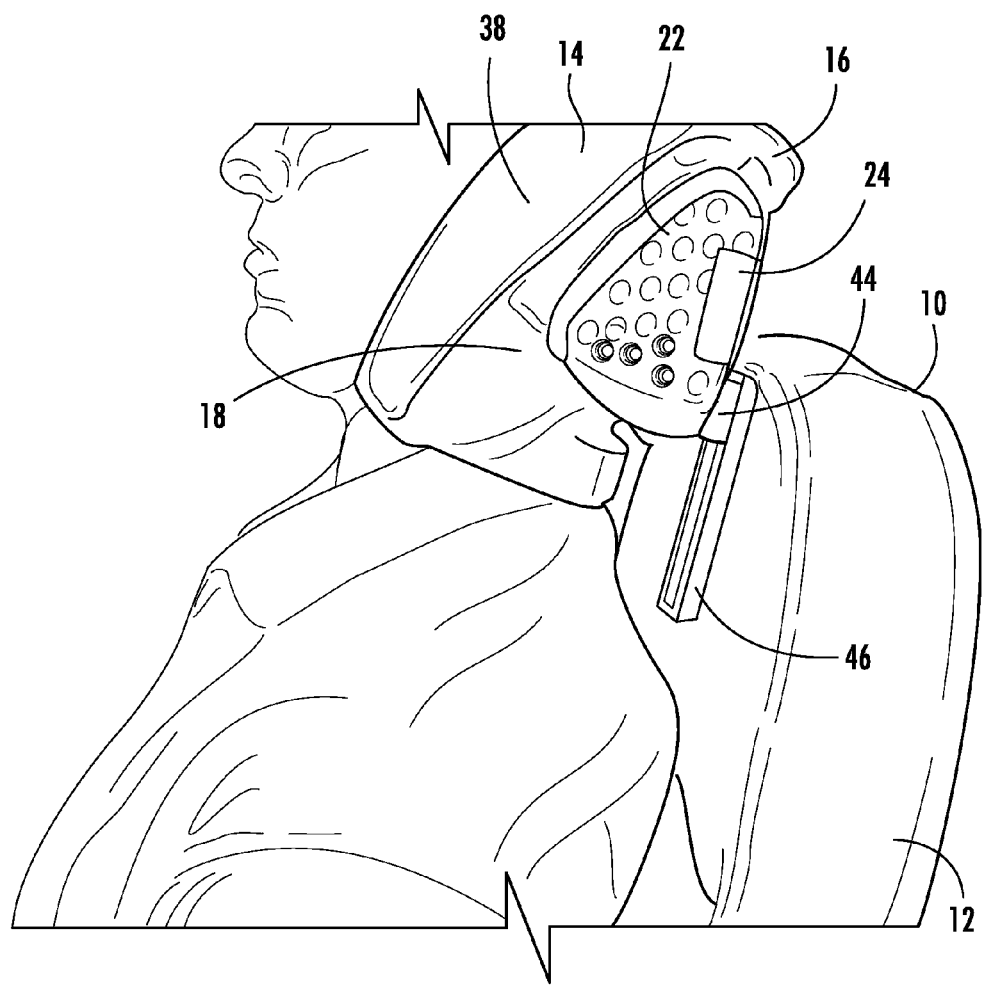
FIG. 15 is a side perspective view of a passenger seat with the head rest assembly of FIG. 5 in a raised and fully deployed position.

In some embodiments, as best illustrated in FIGS. 5-10 and 13-18, the head support 16 may comprise a head rest pan 20, wherein a pair of side supports 22 may be coupled to the head rest pan 20. The head rest pan 20 and/or the side supports 22 may be formed of aluminum, stainless steel, other metallic materials, composite materials, or other similar materials that provides sufficient strength to support a passenger's head and to withstand passenger handling and abuse. In some embodiments, the head rest pan 20 and/or side supports 22 may include a design having multiple apertures throughout the surface to reduce the amount of weight created by the head rest pan 20. In certain embodiments, a dress cover is included that is configured to enclose the head support 16, the side supports 22, and/or the lower head support 18 for aesthetic and/or safety reasons. In FIGS. 13-15, the aft portions of these components is not enclosed with a dress cover so that the components of the head support 16, the side supports 22, and/or the lower head support 18 may be illustrated.

As shown in FIGS. 5-10 and 13-18, each side support 22 may be coupled to the head rest pan 20 via a hinge 24 or other adjustable mechanism. One of ordinary skill in the relevant art will understand that the side supports 22 may be coupled to the head rest pan 20 via any suitable mechanism that allows a passenger to adjust the amount of support available on either side of the passenger's head by rotating either or both of the side supports 22 forward where the additional support is desired, wherein the mechanism is also configured to maintain each side support 22 in a given position until a further adjustment is made.

For example, the hinge 24 may be a friction hinge, which relies on a constant friction force within the hinge 24 to hold its position throughout a full range of motion. In these embodiments, the hinge 24 may be mounted with a substantially vertical axis of rotation. However, one of ordinary skill in the relevant art will understand that any suitable axis of rotation may be used that provides the desired operation of the hinges 24, including but not limited to slide angles. Suitable torque ranges for the hinge 24 may be 1 in-lb to 3 in-lb. However, one of ordinary skill in the relevant art will understand that any suitable torque range may be used that provides sufficient torque to overcome the torque generated by all the forces acting on the head rest assembly 14, so that the hinge 24 may hold the side supports 22 in position with no external load, while still allowing a suitable range of external force to be applied to overcome the hinge torque and move the side supports 22 into another position within their range of motion.

In other embodiments, the hinge 24 may be a variable friction hinge or a bi-directional friction hinge, a detent hinge, which provides for repeatable soft stops in one or more positions over the entire range of motion, a standard hinge that is combined with a positioning lock that is engaged when the side supports 22 reach the desired location, or any other suitable hinge design.

In certain embodiments, as best illustrated in FIGS. 5-10 and 16-18, the lower head support 18 comprises a rest bar 26 and a pair of extensions 28. The rest bar 26 and/or the extensions 28 may be formed of aluminum, stainless steel, other metallic materials, composite materials, or other similar materials that provides sufficient strength to support a passenger's head and to withstand passenger handling and abuse. A first end 30 of each extension 28 is slidingly coupled to the rest bar 26 via a track 36.

Figure 16:
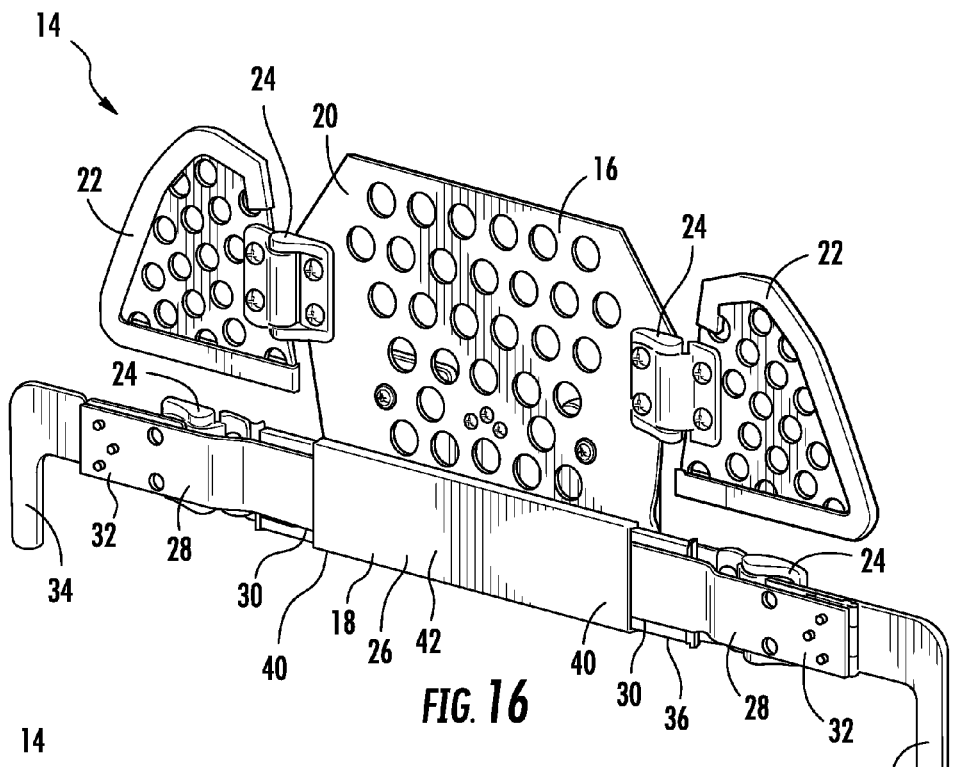
FIG. 16 is a perspective view of a head rest assembly according to certain other embodiments of the present invention with side supports and a lower head support in stowed positions.
Figure 17:
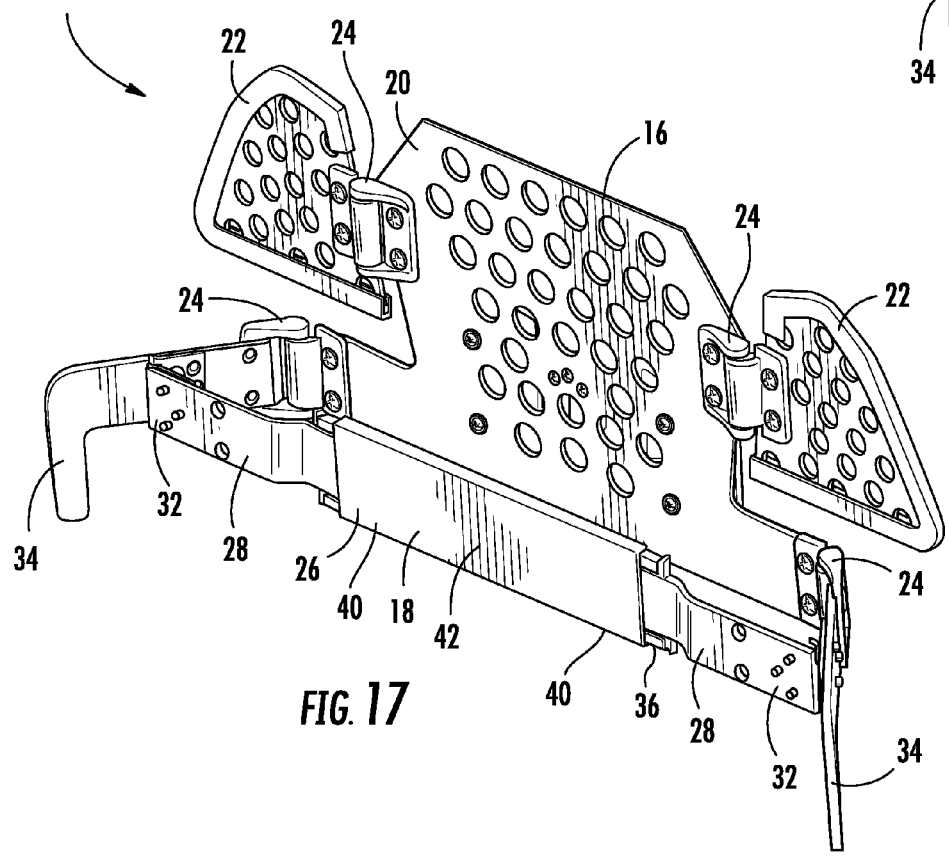
FIG. 17 is a perspective view of the head rest assembly of FIG. 16 with side supports in a stowed position and a lower head support in a fully deployed position.
Figure 18:
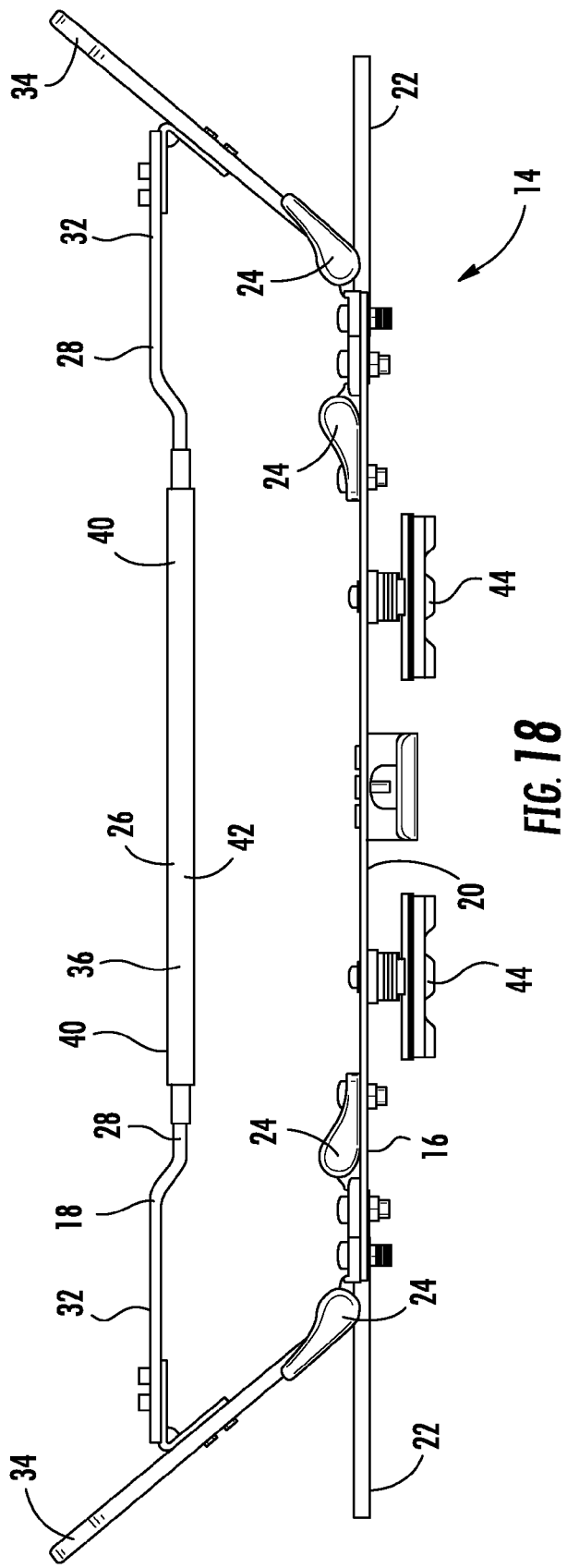
FIG. 18 is a top plan view of the head rest assembly of FIG. 16 with side supports in a stowed position and a lower head support in a fully deployed position.

In certain embodiments, as shown in FIGS. 5-10, a second end 32 of each extension 28 is pivotally coupled to one of the side supports 22. In other embodiments, as shown in FIGS. 16-18, the second end 32 of each extension 28 is pivotally coupled to one of a pair of deployment arms 34. In these various embodiments, the deployment arms 34 may be pivotally coupled to the head rest pan 20 via the hinges 24 as described above with respect to the coupling between the side supports 22 and the head rest pan 20.

In certain embodiments, as shown in FIGS. 3, 11-15, and 19-41, a cushion 38 may be coupled to the head support 16 and the lower head support 18. The covering of the cushion 38 may be formed of any suitable material including but not limited to textiles, woven or nonwoven fabrics, leather, synthetic materials, plastics, or other similar materials. The cushion 38 may have any suitable thickness that provides the desired comfort and support for a passenger's head, while also minimizing the amount of protrusion into a passenger's shoulders and/or upper back when the head rest assembly 12 is stowed. The internal composition of the cushion 38 may include any suitable material that provides a comfortable resting location for a passenger's head, while providing a durable material that will withstand repeated usage. The type of internal cushion material includes but is not limited to viscoelastic materials, foam materials, honeycomb-shaped materials, cushioning materials, or other similar materials. The cushion 38 may coupled to the head support 16 and/or the lower head support 18 via any suitable mechanical or chemical fasteners, including but not limited to a releasable fastening mechanism, such as hook and loop fasteners that may allow the cushion 38 to be replaced without the need to remove the head rest assembly 12, or a permanent fastening mechanism, such as glue or other similar attachment means.

In certain embodiments, a flexible plate or sheet may be positioned between the cushion 38 and the head support 16 and/or the lower head support 18. This plate may be formed of plastics, composites, or other flexible materials capable of withstanding application of repetitive bending forces. In some embodiments, the plate may be substantially similar in shape to the head rest pan 20. The plate is configured to distribute the compressive force generated by the forward movement of the lower head support 18 over the surface of the cushion 38.

In some embodiments, as shown in FIGS. 5-8, 11, and 13, the lower head support 18 is in a stowed position when the side supports 22 are in a stowed position (i.e., the side supports 22 are rotated aft until the side supports 22 are substantially aligned with the head rest pan 20). When the lower head support 18 is in the stowed position, the first end 30 of each extension 28 is located adjacent each end 40 of the track 36 so that the length of the lower head support 18 is maximized to accommodate the stowed position of the side supports 22 and the rest bar 26 is positioned adjacent the head rest pan 20.

Figure 9:
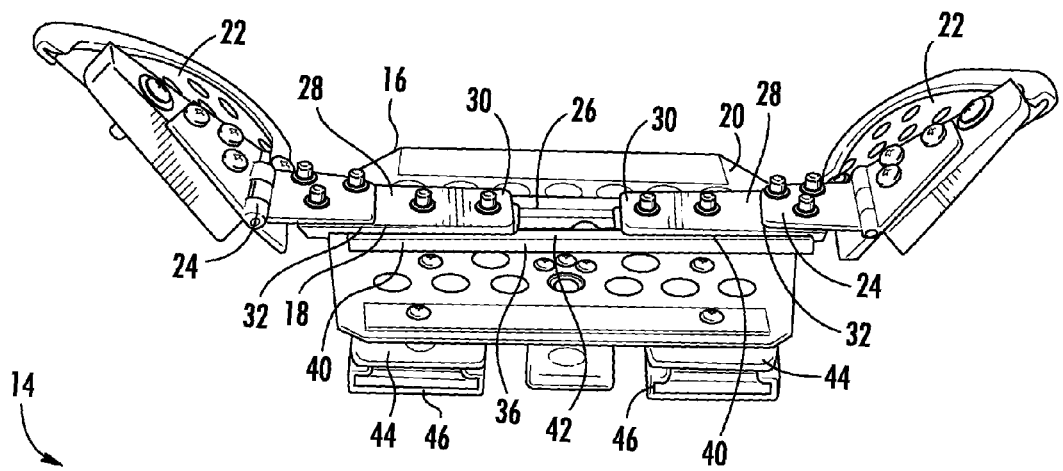
FIG. 9 is a bottom perspective view of the head rest assembly of FIG. 5 in a partially deployed position.
Figure 10:
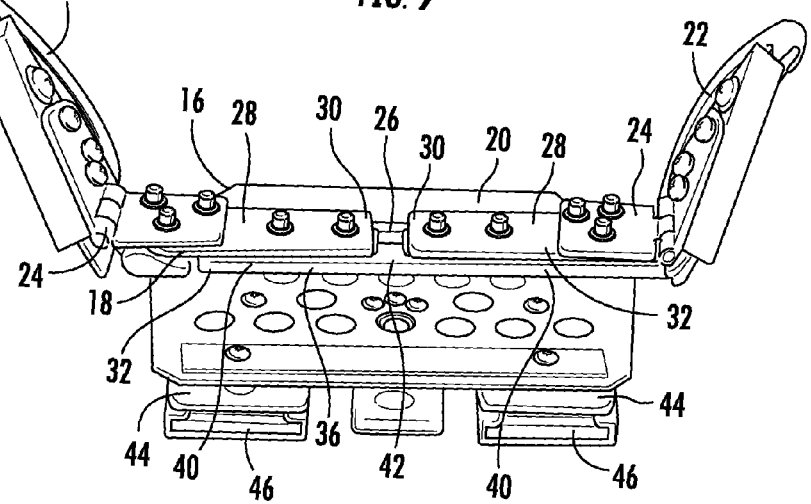
FIG. 10 is a bottom perspective view of the head rest assembly of FIG. 5 in a fully deployed position.
Figure 12:
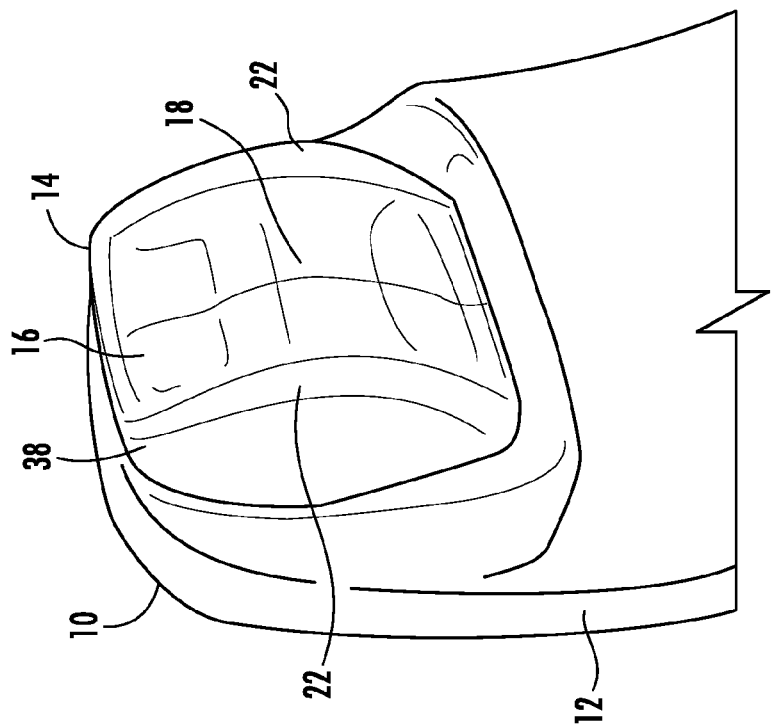
FIG. 12 is a perspective view of a passenger seat with the head rest assembly of FIG. 5 in a fully deployed position.
Figure 11:
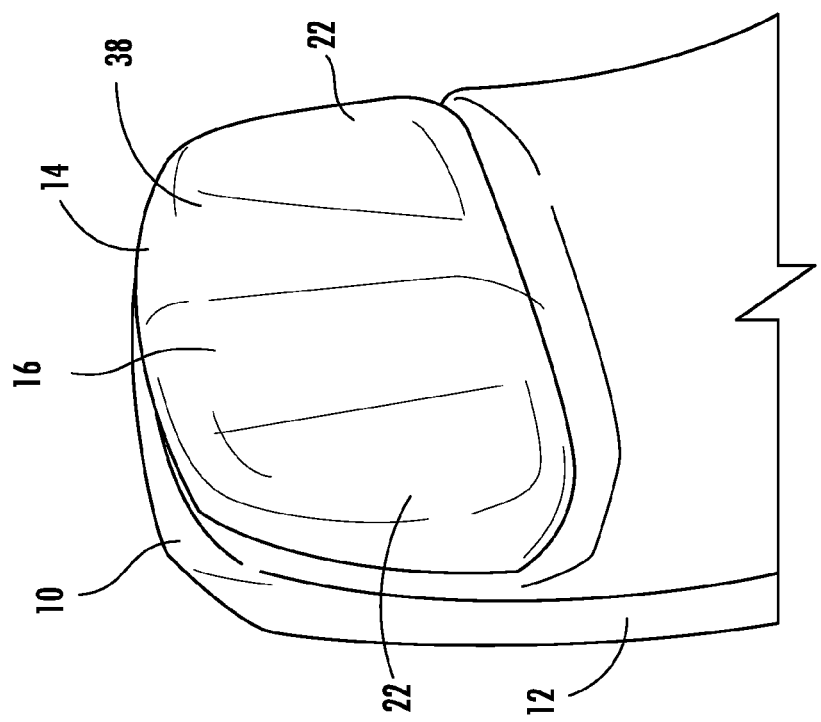
FIG. 11 is a perspective view of a passenger seat with the head rest assembly of FIG. 5 in a stowed position.

As each side support 22 is rotated forward, as best illustrated in FIG. 9, the distance between the side supports 22 is shortened, which in turn causes the first end 30 of one or both extension 28 to slide along the track 36 toward a midpoint 42 of the track 36. The forward rotation of the side supports 22 also moves the entire lower head support 18 forward in the direction of a passenger's head. As a result, the forward movement of the lower head support 18 deforms a portion of the cushion 38 located between the lower head support 18 and the passenger's lower head so that the passenger's lower head is more firmly supported. The lower head support 18 may be adjusted to provide any suitable amount of support by adjusting the amount of forward rotation of one or both side supports 22 (as shown in FIGS. 3 and 5-15). The length of the rest bar 26, the track 36, and the extensions 28 are configured to adjust to the differences in distance between the stowed and fully deployed positions of the side supports 22.

As shown in FIGS. 3, 5, 10, 12, and 14-15, the lower head support 18 is in a fully deployed position when the side supports 22 are in a fully deployed position (i.e., the side supports 22 are rotated forward until the hinge 24 reaches its maximum rotation and/or until the extensions 28 contact one another adjacent the midpoint 42). When the lower head support 18 is in the fully deployed position, the first end 30 of each extension 28 may be located near or adjacent the midpoint 42 of the track 36 so that the length of the lower head support 18 is contracted to accommodate the fully deployed position of the side supports 22 and the rest bar 26 is positioned a distance forward of the head rest pan 20.

In some embodiments, as shown in FIGS. 16-22, the lower head support 18 operation may be separated from the operation of the side supports 22. Thus, in these embodiments, a passenger has the option of adjusting the amount and location of support for the sides of the head (via the side supports 22) separately from the amount and location of support for the lower head (via the deployment arms 34).

Figure 19:
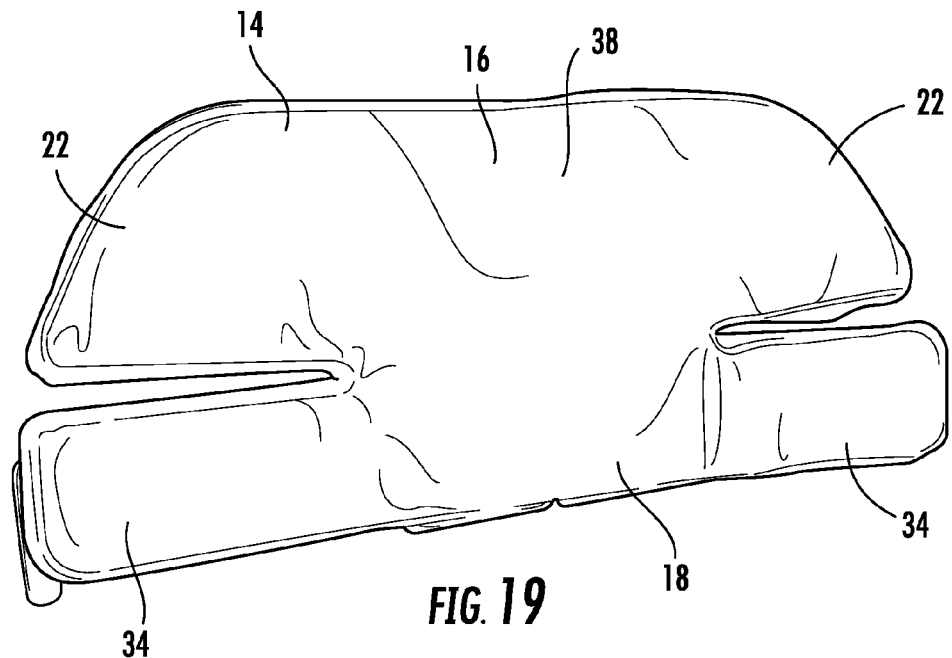
FIG. 19 is a perspective view of the head rest assembly of FIG. 16 with side supports and a lower head support in stowed positions.
Figure 20:
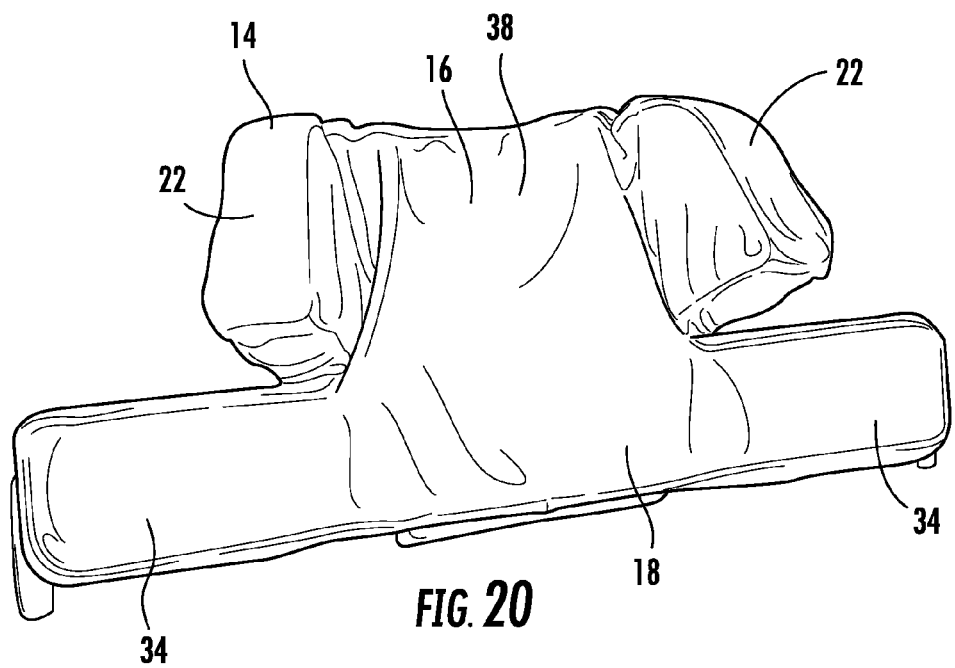
FIG. 20 is a perspective view of the head rest assembly of FIG. 16 with side supports in a fully deployed position and a lower head support in a stowed position.
Figure 21:
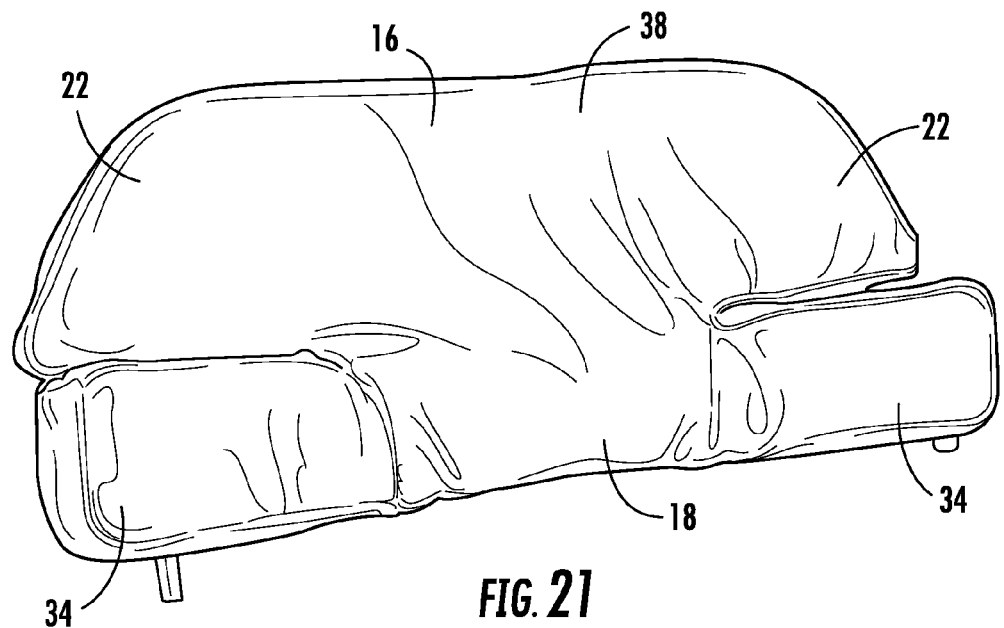
FIG. 21 is a perspective view of the head rest assembly of FIG. 16 with side supports in a stowed position and a lower head support in a fully deployed position.
Figure 22:
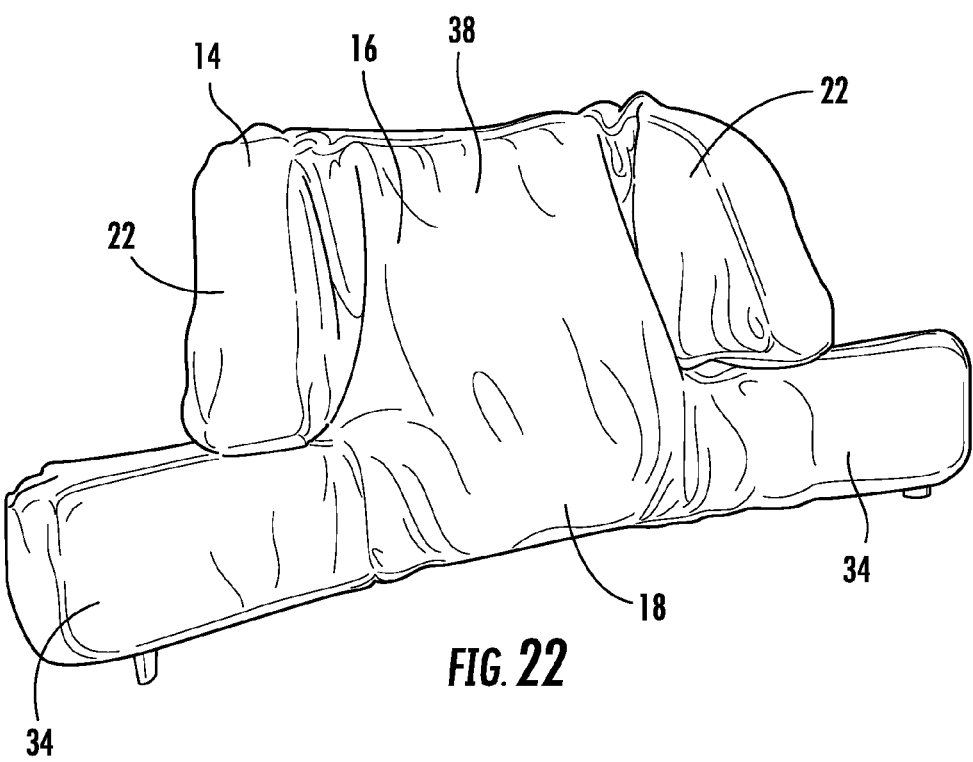
FIG. 22 is a perspective view of the head rest assembly of FIG. 16 with side supports and a lower head support in fully deployed positions.

As shown in FIGS. 16 and 19-20, the lower head support 18 is in a stowed position when the deployment arms 34 are in a stowed position (i.e., the deployment arms 34 are rotated aft until the deployment arms 34 are substantially aligned with the head rest pan 20). When the lower head support 18 is in a stowed position, the first end 30 of each extension 28 is located adjacent each end 40 of the track 36 so that the entire length of the lower head support 18 is maximized to accommodate the stowed position of the deployment arms 34 and the rest bar 26 is positioned adjacent the head rest pan 20.

As each deployment arm 34 is rotated forward, the distance between the deployment arms 34 is shortened, which in turn causes the first end 30 of one or both extensions 28 to slide along the track 36 toward a midpoint 42 of the track 36. The forward rotation of the deployment arms 34 also moves the entire lower head support 18 forward toward a passenger's head. As a result, the forward movement of the lower head support 18 deforms a portion of the cushion 38 located between the lower head support 18 and the passenger's head so that the passenger's lower head is more firmly supported. The lower head support 18 may be adjusted to provide any suitable amount of support by adjusting the amount of forward rotation of one or both deployment arms 34 (as shown in FIGS. 15-22). The length of the rest bar 26, the track 36, and the extensions 28 are configured to adjust to the differences in distance between the stowed and fully deployed positions of the deployment arms 34.

As shown in FIGS. 17-18 and 21-22, the lower head support 18 is in a fully deployed position when the deployment arms 34 are in a fully deployed position (i.e., the deployment arms 34 are rotated forward until the hinge 24 reaches its maximum rotation and/or until the extensions 28 contact one another adjacent the midpoint 42). When the lower head support 18 is in the fully deployed position, the first end 30 of each extension 28 may be located near or adjacent the midpoint 42 of the track 36 so that the entire length of the lower head support 18 is contracted to accommodate the fully deployed position of the deployment arms 34 and the rest bar 26 is positioned a distance forward of the head rest pan 20.

As a result, as shown in FIGS. 16-22, the side supports 22 may have any suitable position ranging from stowed to fully deployed regardless of the position of the lower head support 18, and the lower head support 18 may have any suitable position ranging from stowed to fully deployed regardless of the position of the side supports 22.

Figure 24:
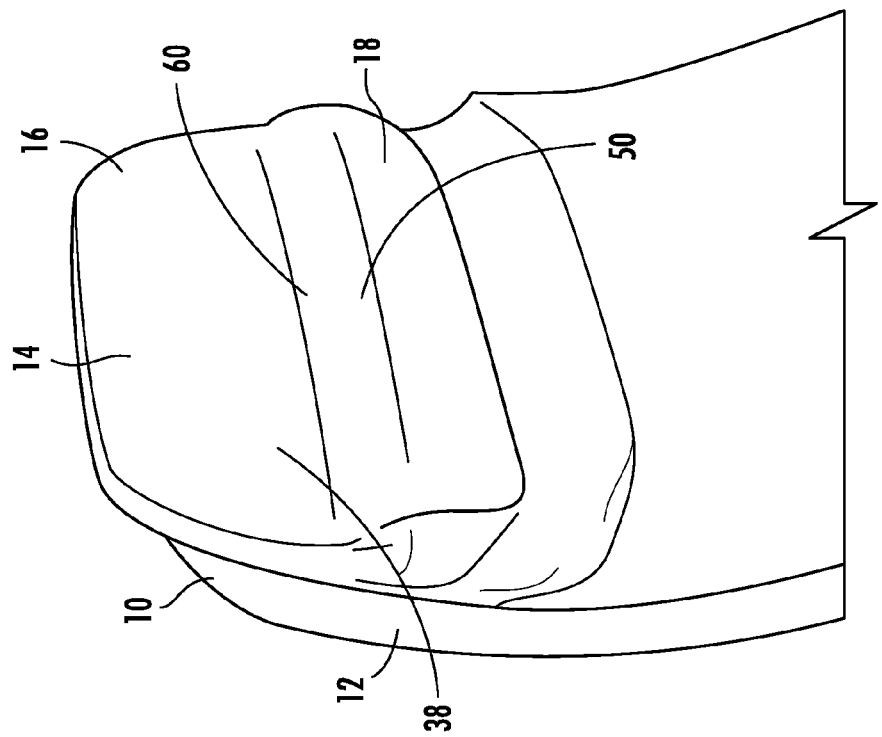
FIG. 24 is a perspective view of a passenger seat with the head rest assembly of FIG. 23 in a fully deployed position.
Figure 23:
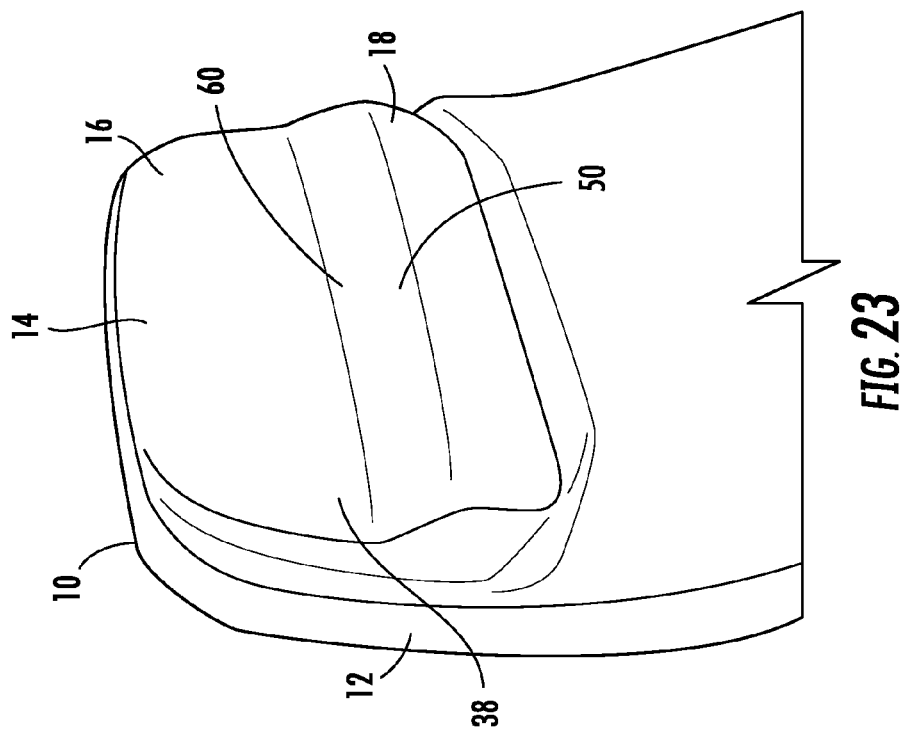
FIG. 23 is a perspective view of a passenger seat with a head rest assembly according to certain other embodiments of the present invention in a stowed position.

As illustrated in FIGS. 3, 7-15, 18, and 23-41, the head rest assembly 14 may be coupled to the seat back support 12 via any suitable mechanism. For example, in certain embodiments, at least one projection 44 may be positioned on an aft side 52 of the head rest pan 20. At least one corresponding track 46 may be positioned on a forward side 56 of the seat back support 12. The projection 44 may be slidingly coupled to the track 46, which may allow the head rest assembly 14 to vertically travel along the track 46 as desired to adjust the vertical position of the head rest assembly 14. For example, as shown in FIGS. 11-14, 23, and 25-26, the head rest assembly 14 may be positioned in a stowed position adjacent a lower end of the track 46. As shown in FIGS. 15, 24, and 27, the head rest assembly 14 may be positioned in a fully deployed position adjacent an upper end of the track 46.

In certain embodiments, as shown in FIGS. 23-29, at least a central portion 50 of the lower head support 18 may be integrally coupled to the head support 16. In at least some of these embodiments, the head rest assembly 14 may be slidingly coupled to the seat back support 12, as described above. As a result, the location of the lower head support 18 may be adjusted to accommodate passengers of different heights so that the lower head support 18 does not protrude into a passenger's shoulders and/or upper back and/or to achieve a desired location to support the passenger's head.

In some embodiments, as shown in FIGS. 25-29, the lower head support 18 may further comprise a pair of bendable sides 48 that are not integrally coupled to the head support 16. In a stowed position, as shown in FIGS. 25 and 28, the bendable sides 48 are positioned approximately planar with a central portion 50 of the lower head support 18. In a fully deployed position, as illustrated in FIGS. 26-27 and 29, one or both bendable sides 48 may be bent into a deployed position that substantially conforms to at least a portion of a side of a passenger's lower head. As a result, in addition to adjusting the vertical position of the head rest assembly 14, the bendable sides 48 may be returned to the stowed position to accommodate passengers of different heights so that the lower head support 18 does not protrude into a passenger's shoulders and/or upper back and/or to achieve a desired location to support the passenger's head.

Figure 31:
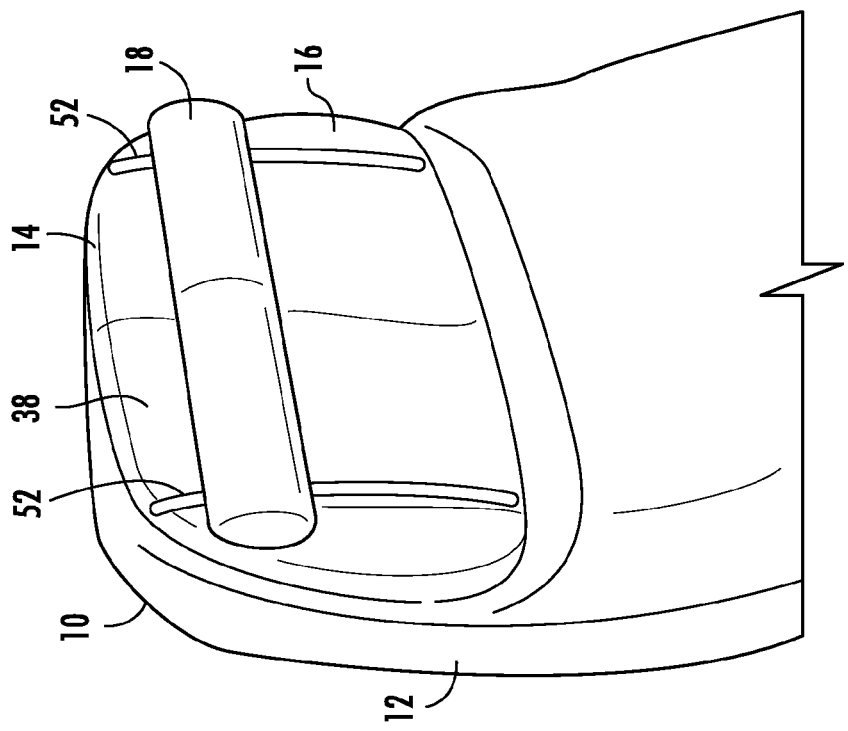
FIG. 31 is a perspective view of a passenger seat with the head rest assembly of FIG. 30 with a lower head support in a fully deployed position.
Figure 30:
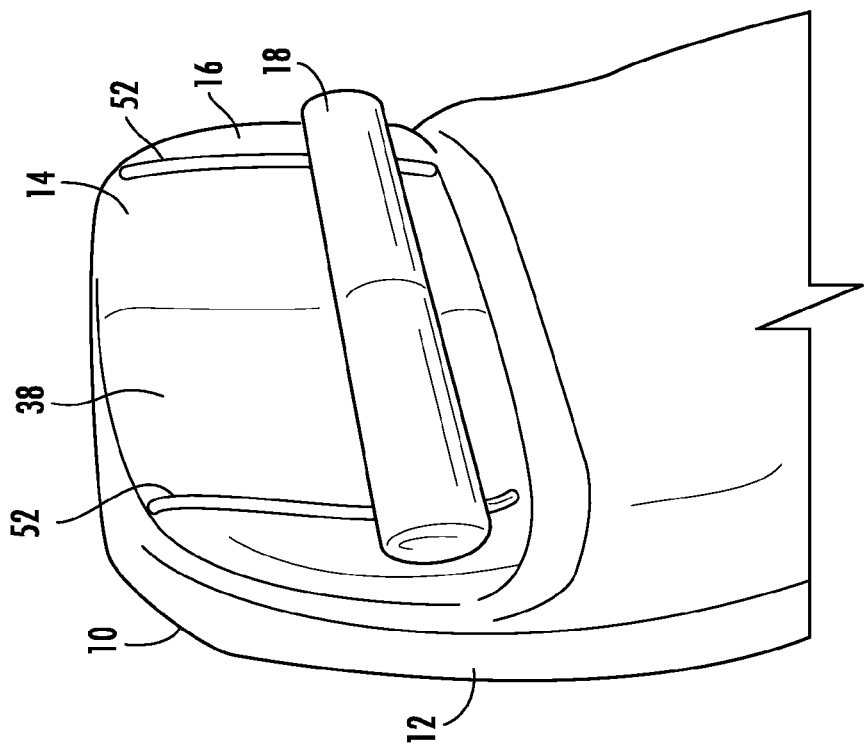
FIG. 30 is a perspective view of a passenger seat with a head rest assembly according to certain other embodiments of the present invention with a lower head support in a stowed position.
Figure 32:
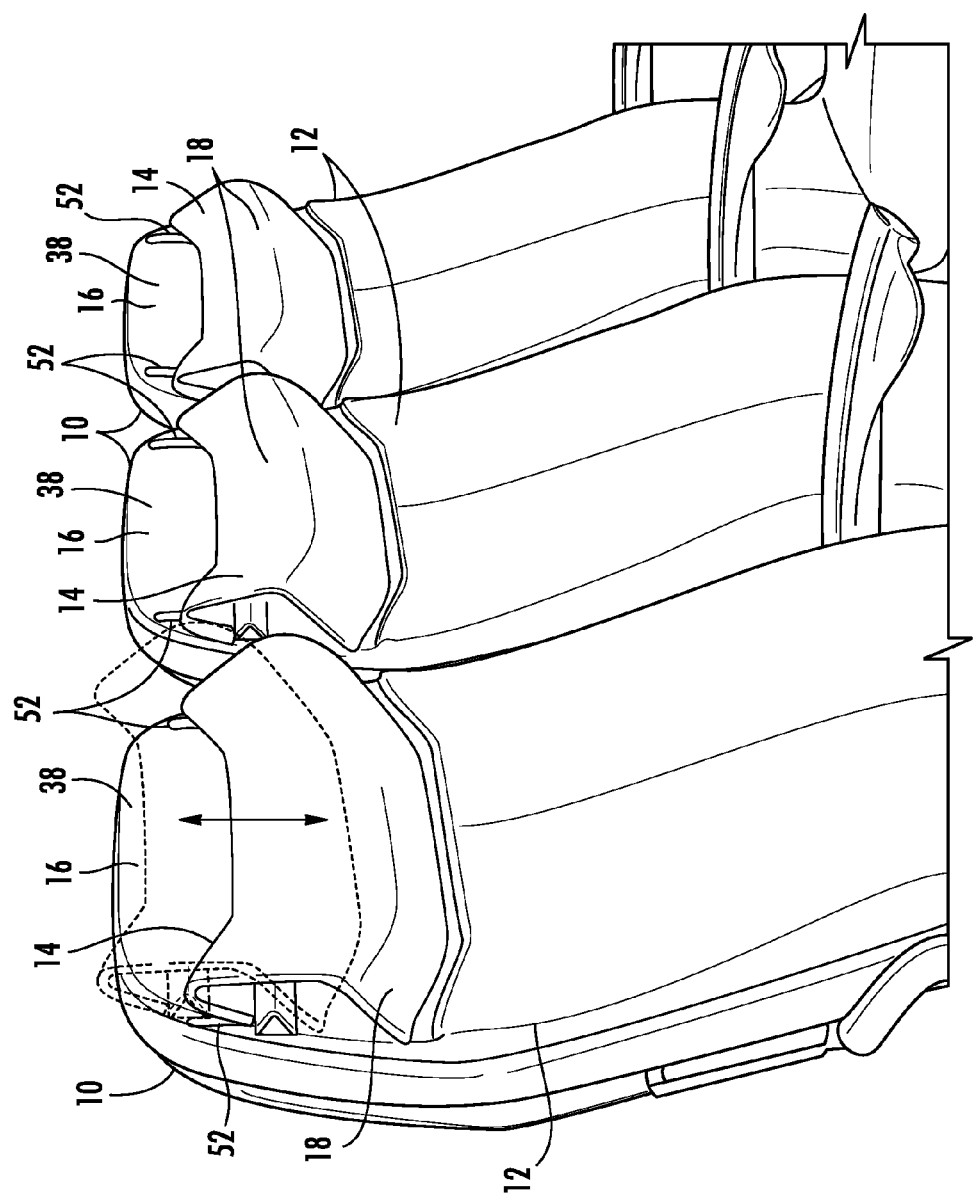
FIG. 32 is a perspective view of a row of passenger seats with head rest assemblies according to certain other embodiments of the present invention.
Figure 33:
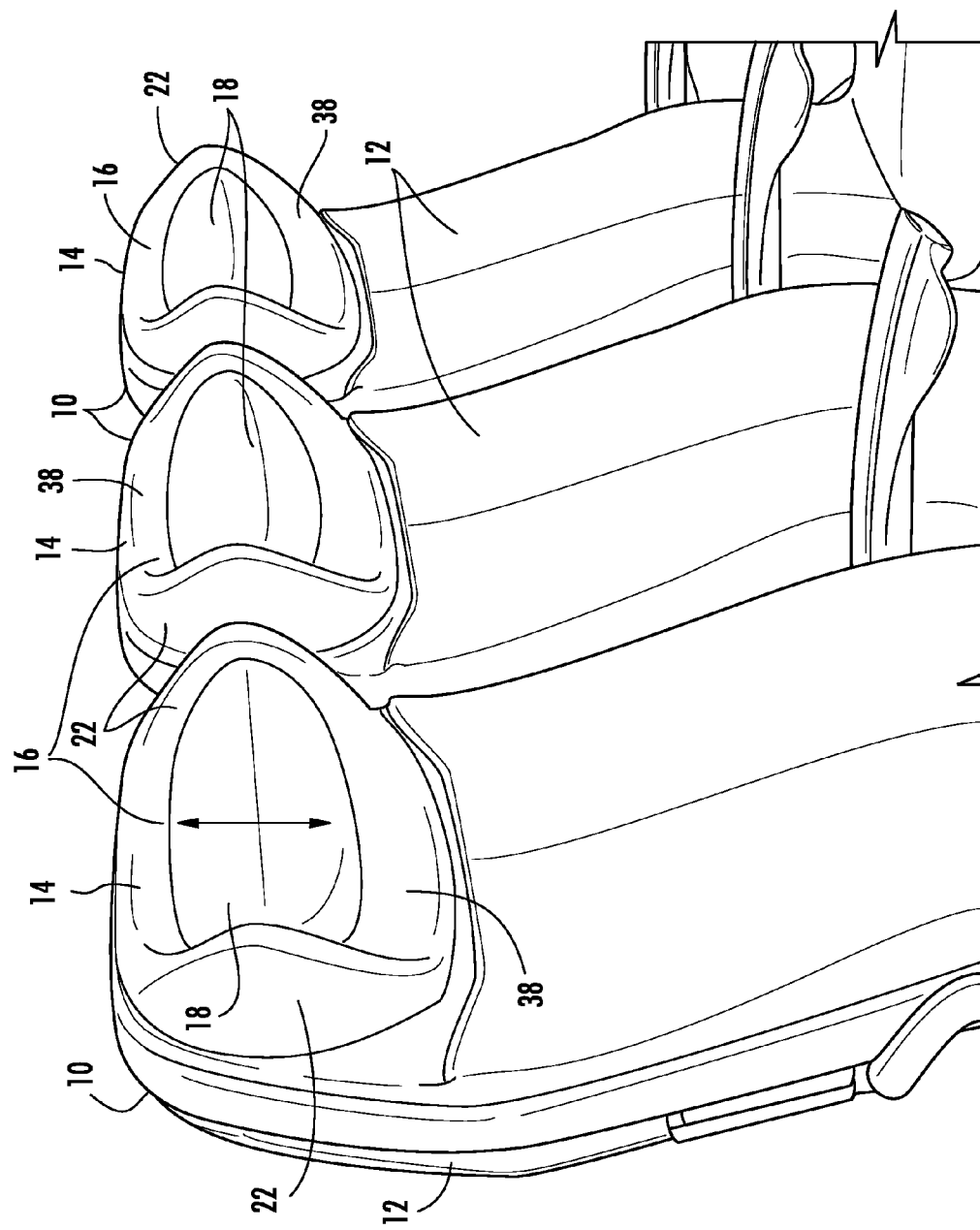
FIG. 33 is a perspective view of a row of passenger seats with head rest assemblies according to certain other embodiments of the present invention.

In yet other embodiments, as shown in FIGS. 30-33, at least one track 52 may be positioned on a forward side 72 of the head support 16. The lower head support 18 may be slidingly coupled to the track 52, which may allow the lower head support 18 to travel along the track 52 as desired to adjust the position of the lower head support 18. In at least some of these embodiments, the head rest assembly 14 may be slidingly coupled to the seat back support 12, as described above. The lower head support 18 may have any suitable shape that provides a desired amount of comfort and support for a passenger's lower head, while also providing a shape that may accommodate a broad range of passenger dimensions. For example, as shown in FIGS. 30-31, the lower head support 18 has a substantially parabolic profile with a substantially uniform shape along its length. The lower head support 18 may also have a more angular profile, as shown in FIGS. 32-33. In certain embodiments, as shown in FIG. 32, the lower head support 18 may also taper down toward the center so as to form a shape that may complement the shape of a passenger's head.

Figure 34:
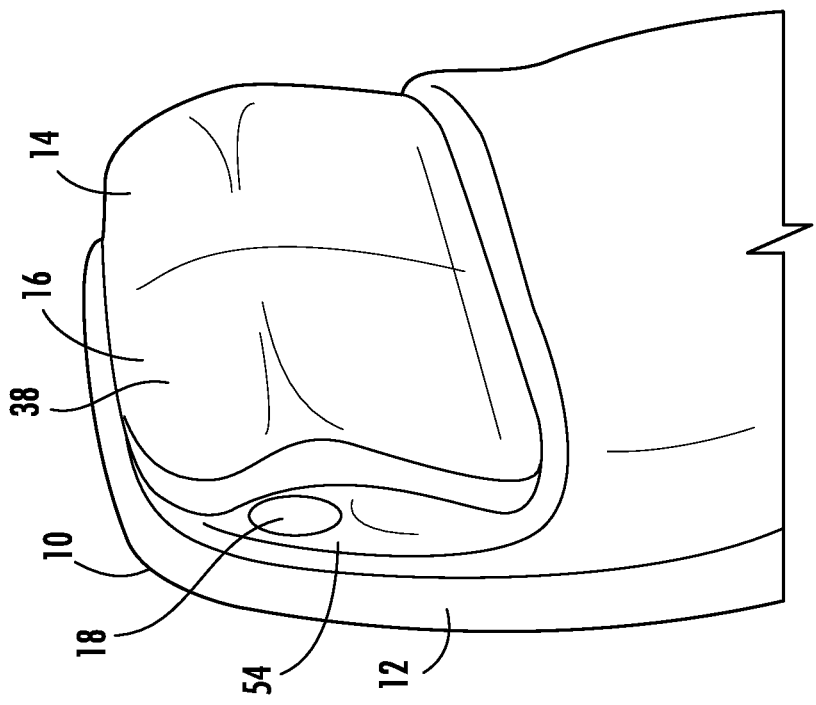
FIG. 34 is a perspective view of a passenger seat with a head rest assembly according to certain other embodiments of the present invention with a lower head support in a stowed position.
Figure 35:
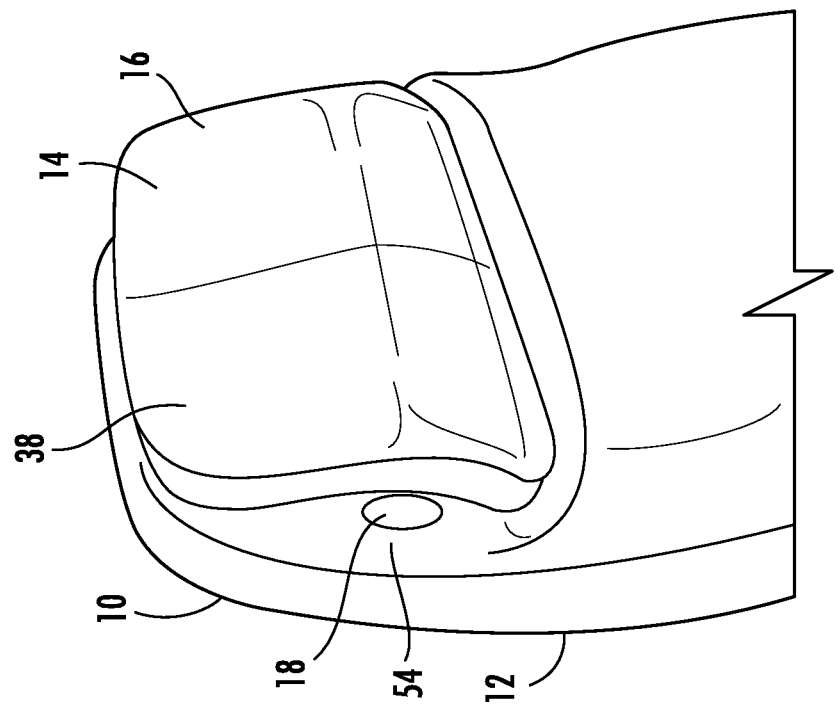
FIG. 35 is a perspective view of a passenger seat with the head rest assembly of FIG. 34 with a lower head support in a fully deployed position.

In some embodiments, as best illustrated in FIGS. 34-35, the lower head support 18 may be sandwiched between the head support 16 and the seat back support 12 so that the lower head support 18 may be able to vertically travel within a pocket 54 formed between the head support 16 and the seat back support 12. As a result, the location of the lower head support 18 may be adjusted to accommodate passengers of different heights so that the lower head support 18 does not protrude into a passenger's shoulders and/or upper back and/or to achieve a desired location to support the passenger's head.

Figure 36:
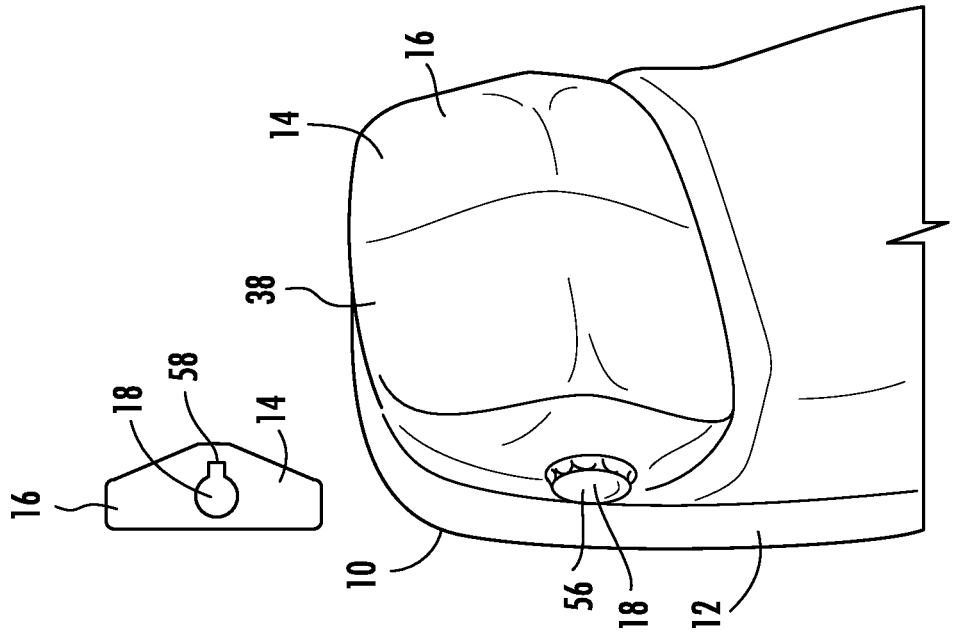
FIG. 36 is a perspective view of a passenger seat with a head rest assembly according to certain other embodiments of the present invention with a lower head support in a stowed position.

In other embodiments, as shown in FIGS. 36-39, the lower head support 18 may be positioned within the head support 16. In these embodiments, the lower head support 18 may be rotatably coupled at each end to the head support 16 so that an adjustment knob 56 protrudes from one or both sides of the head rest assembly 14. The lower head support 18 comprises a projection 58 along its length. The lower head support 18 is in a stowed position when the lower head support 18 is rotated in an aft direction until the projection 58 does not extend in a forward direction, as shown in FIGS. 36 and 38.

Figure 37:
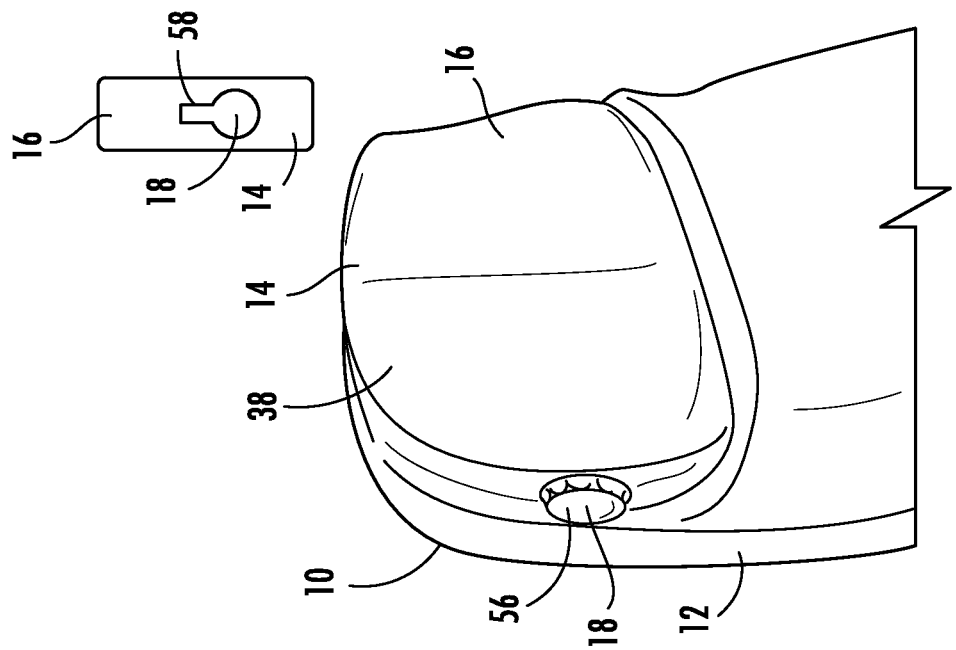
FIG. 37 is a perspective view of a passenger seat with the head rest assembly of FIG. 36 with a lower head support in a fully deployed position.

As the adjustment knob 56 is rotated forward, the projection 58 also rotates forward and deforms a portion of the cushion 38 located between the lower head support 18 and the passenger's lower head so that the passenger's lower head is more firmly supported. The lower head support 18 may be adjusted to provide any suitable amount of support by rotating the lower head support 18 forward until the projection 58 is oriented in a forward direction, at which point the lower head support 18 is in a fully deployed position, as shown in FIGS. 37 and 39. In certain embodiments, as shown in FIGS. 38-39, the rotating lower head support 18 may be combined with the side supports 22. In these embodiments, the side supports 22 are independently operated as described above to provide side support to a passenger's head.

In other embodiments, as shown in FIGS. 40-41, the lower head support 18 may be pivotally coupled to a lower edge 60 of the head support 16. In these embodiments, the lower head support 18 is rotated downward into a stowed position and flipped upward and forward into a deployed position. In these embodiments, the head rest assembly 14 may be slidingly coupled to the seat back support 12, as described above. As a result, the location of the lower head support 18 may be adjusted to accommodate passengers of different heights so that the lower head support 18 contacts a passenger's lower head when deployed and/or to achieve a desired location to support the passenger's head.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat comprising:
    (a) a seat back support;
    (b) a head rest assembly slidingly coupled to the seat back support via at least one track, the head rest assembly comprising:
        (i) a head support;
        (ii) a lower head support comprising a rest bar and a pair of extensions, wherein a first end of each extension is slidingly coupled to the rest bar and a second end of each extension is pivotally coupled to the head support;
    wherein the rest bar is positioned adjacent the head support when the lower head support is in a stowed position, and wherein the rest bar is positioned a distance forward of the head support when the lower head support is in a deployed position.

2. The passenger seat of claim 1, wherein the head support comprises a head rest pan and a pair of side supports pivotally coupled to the head rest pan via a pair of hinges.

3. The passenger seat of claim 2, wherein the second end of each extension is pivotally coupled to one of the pair of side supports via a pair of hinges.

4. The passenger seat of claim 2, wherein the head support further comprises a pair of deployment arms pivotally coupled to the head rest pan via a pair of hinges.

5. The passenger seat of claim 4, wherein the second end of each extension is pivotally coupled to one of the pair of deployment arms via a pair of hinges.

6. The passenger seat of claim 5, wherein the pair of side supports and the pair of deployment arms are configured to rotate between a stowed position and a deployed position independently of the other pair.

7. The passenger seat of claim 1, further comprising a track coupled to the rest bar, wherein the first end of each extension is positioned adjacent each end of the track when the lower head support is in the stowed position, and wherein the first end of each extension is positioned proximate a midpoint of the track when the lower head support is in the deployed position.

8. A passenger seat comprising:
    (a) a seat back support;
    (b) a head rest assembly coupled to the seat back support, the head rest assembly comprising:
        (i) a head support comprising a head rest pan and a pair of lower head deployment arms pivotally coupled to the head rest pan;
        (ii) a lower head support comprising a rest bar and a pair of extensions, wherein a first end of each extension is slidingly coupled to the rest bar and a second end of each extension is pivotally coupled to one of the pair of deployment arms;
    wherein the rest bar is positioned adjacent the head rest pan when the lower head support is in a stowed position, and wherein the rest bar is positioned a distance forward of the head rest pan when the lower head support is in a deployed position.

9. The passenger seat of claim 8, wherein the head support further comprises a pair of side supports pivotally coupled to the head rest pan via a pair of hinges.

10. The passenger seat of claim 9, wherein the pair of side supports and the pair of deployment arms are configured to rotate between a stowed position and a deployed position independently of the other pair.

11. The passenger seat of claim 8, further comprising a track coupled to the rest bar, wherein the first end of each extension is positioned adjacent each end of the track when the lower head support is in the stowed position, and wherein the first end of each extension is positioned proximate a midpoint of the track when the lower head support is in the deployed position.

* * * * *